United States Patent
Johnson et al.

(10) Patent No.: US 10,175,043 B2
(45) Date of Patent: Jan. 8, 2019

(54) TOROIDAL SHAPE RECOGNITION FOR AUTOMATIC COMPASS CALIBRATION SYSTEMS AND METHODS

(71) Applicant: FLIR Belgium BVBA, Meer (BE)

(72) Inventors: Mark Johnson, Vannes (FR); Christopher Yeomans, Fareham (GB)

(73) Assignee: FLIR Belgium BVBA, Meer (BE)

( * ) Notice: Subject to any disclaimer, the term of this patent is extended or adjusted under 35 U.S.C. 154(b) by 151 days.

(21) Appl. No.: 15/393,073

(22) Filed: Dec. 28, 2016

(65) Prior Publication Data

US 2017/0167871 A1    Jun. 15, 2017

Related U.S. Application Data

(63) Continuation-in-part of application No. 14/941,497, filed on Nov. 13, 2015, which is a continuation of application No. PCT/US2014/038286, filed on May 15, 2014.

(60) Provisional application No. 62/273,343, filed on Dec. 30, 2015, provisional application No. 61/823,903, filed on May 15, 2013, provisional application No. 61/823,906, filed on May 15, 2013.

(51) Int. Cl.
*G01C 17/38* (2006.01)
*G01C 17/02* (2006.01)

(52) U.S. Cl.
CPC ............ *G01C 17/38* (2013.01); *G01C 17/02* (2013.01)

(58) Field of Classification Search
CPC .................. G01C 17/38; G01C 21/18
USPC ............................................. 33/356
See application file for complete search history.

(56) References Cited

U.S. PATENT DOCUMENTS

| | | | | |
|---|---|---|---|---|
| 4,660,161 A * | 4/1987 | Okada | ............ | G01C 17/38 33/356 |
| 5,251,139 A * | 10/1993 | Takano | ............ | G01C 21/28 33/356 |
| 5,689,445 A * | 11/1997 | Vogt | ............ | G01C 17/30 701/530 |
| 6,543,146 B2 * | 4/2003 | Smith | ............ | G01C 17/38 33/356 |
| 7,086,164 B2 * | 8/2006 | Satoh | ............ | G01C 17/30 33/1 E |
| 7,451,549 B1 * | 11/2008 | Sodhi | ............ | G01C 17/38 33/356 |

(Continued)

FOREIGN PATENT DOCUMENTS

WO    WO 2012/044964    4/2012

*Primary Examiner* — Christopher W Fulton
(74) *Attorney, Agent, or Firm* — Haynes and Boone, LLP

(57) ABSTRACT

Techniques are disclosed for systems and methods to provide automatic and substantially continuous calibration for compasses mounted to moving structures. A compass calibration system may include a logic device configured to receive one or more sensor signals and determine a corrected magnetic field based, at least in part, on a measured local magnetic field. The logic device may be configured to receive the measured local magnetic field comprising a series of magnetic measurements associated with a mobile structure; determine a valid portion of a toroidal shape of the series of magnetic measurements that is available for further processing; and determine the corrected magnetic field based, at least in part, on calibration parameters derived from at least the valid portion of the toroidal shape.

20 Claims, 38 Drawing Sheets

(56) References Cited

U.S. PATENT DOCUMENTS

| | | | |
|---|---|---|---|
| 7,613,581 B2* | 11/2009 | Skvortsov | G01C 17/38 33/356 |
| 2004/0123474 A1 | 7/2004 | Manfred et al. | |
| 2008/0052933 A1* | 3/2008 | Yamada | G01C 17/28 33/356 |
| 2008/0066331 A1* | 3/2008 | Brzezinski | G01C 17/30 33/356 |
| 2009/0254294 A1* | 10/2009 | Dutta | G01C 17/28 702/92 |
| 2009/0292495 A1 | 11/2009 | Navarro, Jr. et al. | |
| 2011/0077889 A1 | 3/2011 | Vogt | |
| 2011/0241656 A1 | 10/2011 | Piemonte et al. | |
| 2011/0248704 A1* | 10/2011 | Chowdhary | G01C 17/38 324/202 |
| 2012/0136573 A1* | 5/2012 | Janardhanan | G01C 21/165 701/512 |
| 2013/0006573 A1* | 1/2013 | Brunner | G01C 17/38 702/141 |

* cited by examiner

1916

```
function RollPitch = stabilised_rp_detector(accel,TC,gyro) %#codegen r=1;
p=2;
y=3;
dt=TC(3);

persistent Roll;
persistent Pitch;

%protect for divide by zero
if accel(3)==0
   accel(3)=0.000001;
end if isempty(Roll)
   Roll=atan(accel(2)/accel(3));
   accel=Rx(-Roll,accel);
   Pitch=atan(-accel(1)/accel(3));
else
   roll=atan(accel(2)/accel(3));
   Roll=Roll+dt*((roll-Roll)/TC(1)+cos(Pitch)*gyro(r)+sin(Pitch)*gyro(y));

accel=Rx(-Roll,accel);

pitch=atan(-accel(1)/accel(3));
   Pitch=Pitch+dt*((pitch-Pitch)/TC(2)+cos(Roll)*gyro(p)-sin(Roll)*gyro(y));
end RollPitch=[Roll;Pitch];
```

```
function [heading,magnitude] = gyrocomp_projection(rp,mag) %#codegen mag=Ry(-rp(2),Rx(-rp(1),mag));
proj=complex(mag(1),mag(2));

heading = mod(-angle(proj),2*pi);
magnitude = abs(proj);
```

```
function rpy_rate = gyro_rate_2_RPY_rate(RPY,gyro_rate)%#codegen

R = RPY(1); % phi
P = RPY(2); % theta
Y = RPY(3); % psi

% T = [1, 0, -sin(P); 0, cos(R), cos(P)*sin(R); 0, -sin(R), cos(P)*cos(R)];
% T is NOT a rotation matrix! So its inverse is not just the transpose!
Tinv = [1, sin(R)*tan(P), cos(R)*tan(P); 0, cos(R), -sin(R); 0, sec(P)*sin(R), cos(R)*sec(P)];
rpy_rate = Tinv*gyro_rate;
```

```
function RollPitch = roll_pitch_detector(accel) %#codegen

%protect for divide by zero
if accel(3)==0
    accel(3)=0.000001;
end

Roll=atan(accel(2)/accel(3));

accel=Rx(-Roll,accel);

Pitch=atan(-accel(1)/accel(3));

RollPitch=[Roll;Pitch];
```

```
function [heading,magnitude] = gyrocomp_projection(rp,mag) %#codegen mag=Ry(-rp(2),Rx(-rp(1),mag));
proj=complex(mag(1),mag(2));

heading = mod(-angle(proj),2*pi);
magnitude = abs(proj);
```

```
function out = RPY_rate_2_gyro_rate(RPY_rate,RPY)

%#codegen
R = RPY(1); % phi
P = RPY(2); % theta
Y = RPY(3); % psi

T = [1, 0, -sin(P); 0, cos(R), cos(P)*sin(R); 0, -sin(R), cos(P)*cos(R)];
out = T*RPY_rate;
```

```
function storing_out = StorePoints(ring_position,mag,activated,rp,erase_buffered_data) %#codegen % points are buffered, because the 'activated' flag may be dropped after
% the data quality has deteriorated. For example when and external mag
% deteriortation occurs, the detector filters lead to a delayed
% lowering of the 'activated' flag persistent points_buffer;
persistent last_stored_point;
persistent age_timer;
persistent one_second_timer;
persistent proximity_record_idx;
persistent proximity_record;
persistent storing;

global MagHistory;
global RPAHistory;

if isempty(points_buffer)
    points_buffer = zeros(5,Constants.points_buffer_length,'int16');
    last_stored_point = zeros(5,1,'int16');
    age_timer = uint16(0);
    one_second_timer = uint16(0);
    proximity_record_idx = uint16(1);
    proximity_record = 65535*ones(1,Constants.log_size,'uint16');
    storing = uint8(0);
    RPAHistory=int8(zeros(3,Constants.log_size));
    MagHistory=int16(zeros(3,Constants.log_size));
end shell_radius = sqrt(sum(ring_position.^2));

one_second_timer = one_second_timer+1;
if one_second_timer >= uint16(1/Constants.dt);
    one_second_timer = uint16(0);
    age_timer = age_timer + 1;
    if age_timer >= 60
        % One minute has elapsed so decrement the ages in the field history
        RPAHistory(3,:) = max(RPAHistory(3,:)-1,0);
        age_timer = uint16(0);
    end if activated
        new_point = int16([mag*Constants.gauss; rp*Constants.rp_radian]);
        % add this point to the front of the buffer and shift the buffer
        points_buffer = [new_point, points_buffer(:,1:Constants.points_buffer_length-1)];
        % take the point to be used in this cycle from the buffer end
        this_point = points_buffer(:,Constants.points_buffer_length);
        mag_displacement = this_point(1:3)-last_stored_point(1:3);
        ang_rotation = this_point(4:5)-last_stored_point(4:5);
        ang_displacement = int16(single(ang_rotation)*shell_radius*Constants.gauss/Constants.rp_radian);
        displacement = [mag_displacement;ang_displacement];
        distance_moved = int16(sqrt(sum(single(displacement).^2)));
        separation_threshold = max(Constants.min_separation, ...
                    shell_radius*Constants.std_separation);
%       separation_threshold = int16(single(separation_threshold) * ...
%           (single(Constants.log_size)/(single(Constants.log_size+1)-single(sum(RPAHistory(3,:)>0))))^0.3);
```

```
% to store a point, the roll and pitch must be in range for an sint8
% the new point must have moved far enough from the last stored point
% and buffer must be fully loaded
if max(abs(this_point(4:5))) < Constants.max_rp_for_storing ...
        && distance_moved >= separation_threshold ...
        && sum(abs(points_buffer(:,Constants.points_buffer_length))) > 0
    % first look for unused records
    store_indx = 1;
    while store_indx < Constants.log_size && RPAHistory(3,store_indx)>0
        store_indx = store_indx + 1;
    end
    % if none free, pick the least useful point in the log
    if store_indx == Constants.log_size
        [value,store_indx] = min(proximity_record);
    end
    MagHistory(:,store_indx)=this_point(1:3);
    RPAHistory(:,store_indx)=[this_point(4:5);int8(Constants.field_age_limit_minutes)];
    last_stored_point = this_point;
    storing = uint8(1);
    end
else
    if erase_buffered_data
        points_buffer = zeros(5,Constants.points_buffer_length,'int16');
    end
    storing = uint8(0);
end
else
    %crawl through the data to build a record of each point's closest point
    min_separation = single(1e7);
    closest_point_idx = uint16(0);
    for idx=1:Constants.log_size
        if RPAHistory(3,idx)>0 && RPAHistory(3,proximity_record_idx)>0
            reference_point_mag = MagHistory(:,proximity_record_idx);
            reference_point_ang = int16(single(RPAHistory(1:2,proximity_record_idx))*shell_radius*Constants.gauss/Constants.rp_radian);
            reference_point = [reference_point_mag;reference_point_ang];
            log_point_mag = MagHistory(:,idx);
            log_point_ang = int16(single(RPAHistory(1:2,idx))*shell_radius*Constants.gauss/Constants.rp_radian);
            log_point = [log_point_mag;log_point_ang];
            separation = sqrt(sum((single(reference_point-log_point)).^2));
            if separation < min_separation && idx~=proximity_record_idx
                min_separation = separation;
                closest_point_idx = idx;
            end
        end
    end
    if closest_point_idx >0
        proximity_record(proximity_record_idx) = min_separation;
        proximity_record_idx = proximity_record_idx + 1;
        if proximity_record_idx > Constants.log_size
            proximity_record_idx = uint16(1);
        end
    end
end
storing_out = storing;
dummy=1;
end
```

```
global MagHistory;
global MagneticParams;
global RPAHistory;
global CostFunction;
global EstimatedDeviation;
global MagneticVariance;

if isempty(current_delta_idx)
   current_delta_idx=uint8(1);
   best_idx=uint8(1);
   best_CostFunction=single(1e8);
   vertical_field_spread_ok = uint8(0);
   dwell_timer_minutes = uint32(0);
   counter_one_minute = uint32(0);
   ring_position = single([0; 0.1]); %inital ring radius small to ensure points captured densely in far north/south
   deviation_shift_timer_minutes = uint32(0);
end if activated
   counter_one_minute = counter_one_minute + 1;
   if counter_one_minute > 60/Constants.dt % One minute
      counter_one_minute = uint32(0);
      if dwell_timer_minutes < Constants.dwell_timeout
         dwell_timer_minutes = dwell_timer_minutes + 1;
         deviation_shift_timer_minutes = deviation_shift_timer_minutes + 1;
      end
   end d = delta(current_delta_idx,:);
   if current_delta_idx <= last_cross_term                    2280
      d(1:3) = d(1:3) * abs(ring_position(1));
   end
   [is_complete, cost_fn, var, ring_pos] = calculate_least_squares...
       (d, MagneticParams(2,:), MagHistory, RPAHistory);
   if is_complete
      MagneticVariance(candidate,:) = var;
      if (MagneticVariance(candidate,rplog) > Constants.thold_for_3d
         vertical_field_spread_ok = uint8(1);
      else
         vertical_field_spread_ok = uint8(0);
      end if cost_fn(1) < best_CostFunction
         best_CostFunction = cost_fn(1);
         best_idx = current_delta_idx;
      end
      current_delta_idx = current_delta_idx + 1;
      % without or vertical data, h3 and 533 must avoid end stops
      while current_delta_idx<length(delta) && is_delta_bad(delta, current_delta_idx, vertical_field_spread_ok, MagneticParams(2,:),...
            vertical_terms, para_max, para_min)
         current_delta_idx = current_delta_idx + 1;
      end
      if current_delta_idx > length(delta)
         % We have finished trying all the possible adjustments, so
         % apply the best one and start the process again
         ring_position = ring_pos;
         MagneticParams(candidate,:) = MagneticParams(candidate,:)+delta(best_idx,:);
```

FIG. 22B

2214C 

```
        CostFunction(candidate,:) = cost_fn;
        [deviation_mag, deviation_ang] = calculate_deviation(MagneticParams(candidate,:),ring_position);
        EstimatedDeviation(candidate,:) = [deviation_mag deviation_ang];
        current_delta_idx = uint8(1);
        best_CostFunction = single(1e8);
        best_idx = uint8(1);
        if MagneticVariance(candidate,maglog) > MagneticVariance(active,maglog)*exp(-single(dwell_timer_minutes)/
Constants.dwell_timeout) && ...
            (CostFunction(candidate,1) < CostFunction(active,1)*exp(single(dwell_timer_minutes)/Constants.dwell_timeout) || ...
             MagneticVariance(candidate,rplog) > MagneticVariance(active,rplog)*1.2*exp(-single(dwell_timer_minutes)/
Constants.dwell_timeout))
          MagneticParams(active,:) = MagneticParams(candidate,:);
          CostFunction(active,:) = CostFunction(candidate,:);
          EstimatedDeviation(active,:) = EstimatedDeviation(candidate,:);
          MagneticVariance(active,:) = MagneticVariance(candidate,:);
          dwell_timer_minutes = uint32(0);
        else
          candidate_deviation_complex = EstimatedDeviation(candidate,1) + exp(1i * EstimatedDeviation(candidate,2));
          active_deviation_complex = EstimatedDeviation(active,1) + exp(1i * EstimatedDeviation(active,2));
          if abs(candidate_deviation_complex - active_deviation_complex) < Constants.deviation_value_threshold
            dwell_timer_minutes = uint32(0);
          end
        end
      end
    end
  end
end
fitting_mode_out = vertical_field_spread_ok;
ring_position_out = ring_position;
deviation_shift_alarm_out = deviation_shift_timer_minutes >= Constants.deviation_shift_time_threshold;
end
```

```
function [is_complete, cost_function_out, rp_variance_out, ring_position_out] = calculate_least_squares(delta, parameters, mag_log,
rpa_log) %#codegen
    persistent current_idx;
    persistent ring;
    persistent usable;

if isempty(ring)
        current_idx = uint16(1);
        usable = uint16(0);
        ring = zeros(3,Constants.log_size,'single');
    end max_per_step=uint16(100);
    num_processed=uint16(0);

while current_idx <= Constants.log_size && num_processed < max_per_step
        if current_idx == 1
            ring = zeros(3,Constants.log_size,'single');
            usable = uint16(0);
        end
        if rpa_log(3,current_idx) > 0
            num_processed = num_processed + 1;
            usable = usable + 1;
            roll=single(rpa_log(1,current_idx))/Constants.rp_radian;
            pitch=single(rpa_log(2,current_idx))/Constants.rp_radian;
            ring(:,usable)=apply_parameters...
                (single(mag_log(:,current_idx))/Constants.gauss,parameters+delta,roll,pitch,0);
        end
        current_idx = current_idx + 1;
    end
    % We got to the end of all the stored points
    term = zeros(1,4,'single');
    ring_position = single([0; 0]);
    is_complete = uint8(0);
    rp_var = single(0);
    mag_var = single(0);
    if current_idx > Constants.log_size
        current_idx = uint16(1);
        if usable > Constants.minimum_points
            % We want to work out the standard deviation of the horizontal
            % and vertical distances of the points in the ring.
            % First we go through the points to find the mean.
            hdistance_sum = single(0);
            vdistance_sum = single(0);
            log_sum = single(zeros(3,1));
            roll_sum = single(0);
            pitch_sum = single(0);
            xmax = single(-1e7*ones(1,3));
            ymax = single(-1e7*ones(1,3));
            xmin = single(1e7*ones(1,3));
            ymin = single(1e7*ones(1,3));
            for i=1:usable
                hdist = sqrt(ring(1,i)^2 + ring(2,i)^2);
                hdistance_sum = hdistance_sum + hdist;
                vdistance_sum = vdistance_sum + ring(3,i);
                log_sum = log_sum + single(mag_log(:,i))/(0.4*Constants.gauss);
                roll_sum = roll_sum + single(rpa_log(1,i));
                pitch_sum = pitch_sum + single(rpa_log(2,i));
```

```
        xmax = max3rd(xmax, ring(1,i));
        ymax = max3rd(ymax, ring(2,i));
        xmin = min3rd(xmin, ring(1,i));
        ymin = min3rd(ymin, ring(2,i));
    end
    hdistance_mean = hdistance_sum / single(usable);
    vdistance_mean = vdistance_sum / single(usable);
    log_mean = log_sum / single(usable);
    roll_mean = roll_sum / single(usable);
    pitch_mean = pitch_sum / single(usable);
    % Go through the points again to work out the variance
    hdistance_sum_sq = single(0);
    vdistance_sum_sq = single(0);
    mag_sum_sq = single(zeros(3,1));
    roll_sum_sq = single(0);
    pitch_sum_sq = single(0);
    for i=1:usable
        hdist = sqrt(ring(1,i)^2 + ring(2,i)^2);
        hdistance_sum_sq = hdistance_sum_sq + (hdist - hdistance_mean)^2;
        vdistance_sum_sq = vdistance_sum_sq + (ring(3,i) - vdistance_mean)^2;
        mag_sum_sq = mag_sum_sq + (single(mag_log(:,i))/(0.4*Constants.gauss) - log_mean).^2;
        roll_sum_sq = roll_sum_sq + (single(rpa_log(1,i)) - roll_mean)^2;
        pitch_sum_sq = pitch_sum_sq + (single(rpa_log(2,i)) - pitch_mean)^2;
    end
    hdistance_var = hdistance_sum_sq / single(usable);
    vdistance_var = vdistance_sum_sq / single(usable);
    mag_var = sum(mag_sum_sq)/(sqrt(single(usable))/100);
    rp_var = (roll_sum_sq + pitch_sum_sq) / (single(usable) * (Constants.rp_deg^2));
    ring_xspan = xmax(3)-xmin(3);
    ring_yspan = ymax(3)-ymin(3);
    ring_radius = (ring_xspan + ring_yspan)/2;
    ring_height = vdistance_mean;
    ring_centre = 0.5*[xmax(3) + xmin(3) ; ymax(3) + ymin(3)];
    long_axis=sqrt(ring_xspan^2+ring_yspan^2);

dmin = single(1e7*ones(1,3));
    for i=1:usable
        delta = sqrt((ring_centre(1) - ring(1,i))^2 + (ring_centre(2) - ring(2,i))^2);
        dmin = min3rd(dmin, delta);
    end
    short_axis=dmin(3)*2;
    term(1) = hdistance_var;
    term(2) = vdistance_var;
    term(3) = max(0,sum(ring_centre.^2)-(Constants.centre_deadband*ring_radius)^2);
    term(4) = parameters(3)^2+((parameters(8)-1)*abs(ring_height))^2;
    term = term.*Constants.cost_fn_gains;
    ring_position = single([ring_height; ring_radius]);
    if (ring_xspan > Constants.ring_min_span && ...
        ring_yspan > Constants.ring_min_span && ...
        short_axis/long_axis > 1/Constants.max_stretch )
        is_complete = uint8(1);
        end
    end
  end
end
rp_variance_out = [mag_var, rp_var];
ring_position_out = ring_position;
cost_function_out = [sum(term), term] ;
end
```

FIG. 23B

```
function magout = rollpitch_correct(rp,mag) %#codegen magout = Ry(-rp(2),Rx(-rp(1),mag));
```

```
function y = ApplyParams(mag) %#codegen global MagneticParams;
param = MagneticParams;
y=single(apply_parameters(mag,param(1,:),single(0),single(0),0));
```

FIG. 32

TOROIDAL SHAPE RECOGNITION FOR AUTOMATIC COMPASS CALIBRATION SYSTEMS AND METHODS

CROSS-REFERENCE TO RELATED APPLICATIONS

This applications claims priority to and the benefit of U.S. Provisional Patent Application No. 62/273,343 filed Dec. 30, 2015 and entitled "TOROIDAL SHAPE RECOGNITION FOR AUTOMATIC COMPASS CALIBRATION SYSTEMS AND METHODS" which is hereby incorporated herein by reference in its entirety.

This application is a continuation-in-part of patent application Ser. No. 14/941,497 filed Nov. 13, 2015 and entitled "AUTOMATIC COMPASS CALIBRATION SYSTEMS AND METHODS," which is a continuation of International Patent Application No. PCT/US2014/038286 filed May 15, 2014 and entitled "AUTOMATIC COMPASS CALIBRATION SYSTEMS AND METHODS," which claims the benefit of and priority to U.S. Provisional Patent Application No. 61/823,903 filed May 15, 2013 and entitled "AUTOMATIC COMPASS CALIBRATION SYSTEMS AND METHODS" and U.S. Provisional Patent Application No. 61/823,906 filed May 15, 2013 and entitled "AUTOMATIC COMPASS CALIBRATION SYSTEMS AND METHODS," all of which are hereby incorporated herein by reference in their entirety.

TECHNICAL FIELD

One or more embodiments of the invention relate generally to compass calibration and more particularly, for example, to systems and methods for automatic compass calibration and providing accurate headings.

BACKGROUND

The earth's magnetic field has long been used to provide a reference from which to estimate headings and plan routes. Typically, a compass is used to measure the local magnetic field, and the earth's magnetic field is either assumed to be equal to the local field or is estimated from the local measurement using a combination of relatively manual factory calibration and user calibration processes. For example, a factory calibration method might include application of external fields in a controlled environment, and a user calibration method might include slowing rotating the compass through a planned series of maneuvers (e.g., providing another type of controlled environment).

These conventional calibration methods require time and/or expensive equipment to implement, and calibrations reached using these methods can rapidly become inaccurate or produce inaccurate headings during relatively uncontrolled motion and other short and long term changing environmental conditions, particularly when the earth's magnetic field includes a relatively large vertical component. GPS based systems have been developed that estimate headings from differential position data, but these types of systems are typically very inaccurate over short linear distances or quick changes in heading. Thus, there is a need for an improved methodology to address compass calibration that provides reliable heading information through a variety of changing environmental conditions.

SUMMARY

Techniques are disclosed for systems and methods to provide automatic compass calibration for heading sensors mounted to moving platforms.

In one embodiment, a system includes a logic device configured to receive one or more sensor signals and determine a corrected magnetic field based, at least in part, on a measured local magnetic field. The logic device may be adapted receive the measured local magnetic field comprising a series of magnetic measurements associated with a mobile structure; determine a valid portion of a toroidal shape of the series of magnetic measurements that is available for further processing; and determine the corrected magnetic field based, at least in part, on calibration parameters derived from at least the valid portion of the toroidal shape.

In another embodiment, a method includes receiving a measured local magnetic field comprising a series of magnetic measurements associated with a mobile structure; determining a valid portion of a toroidal shape of the series of magnetic measurements that is available for further processing; and determining a corrected magnetic field based, at least in part, on calibration parameters derived from at least the valid portion of the toroidal shape.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 19A-C illustrate software code of various operations to provide compass calibration in accordance with embodiments of the disclosure.

FIGS. 20A-C illustrate software code of various operations to provide compass calibration in accordance with embodiments of the disclosure.

FIGS. 21A-B illustrate software code of various operations to provide compass calibration in accordance with embodiments of the disclosure.

FIGS. 22A-C illustrate software code of various operations to provide compass calibration in accordance with embodiments of the disclosure.

FIGS. 23A-B illustrate software code of various operations to provide compass calibration in accordance with embodiments of the disclosure.

FIG. 32 illustrates software code of various operations to provide compass calibration in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
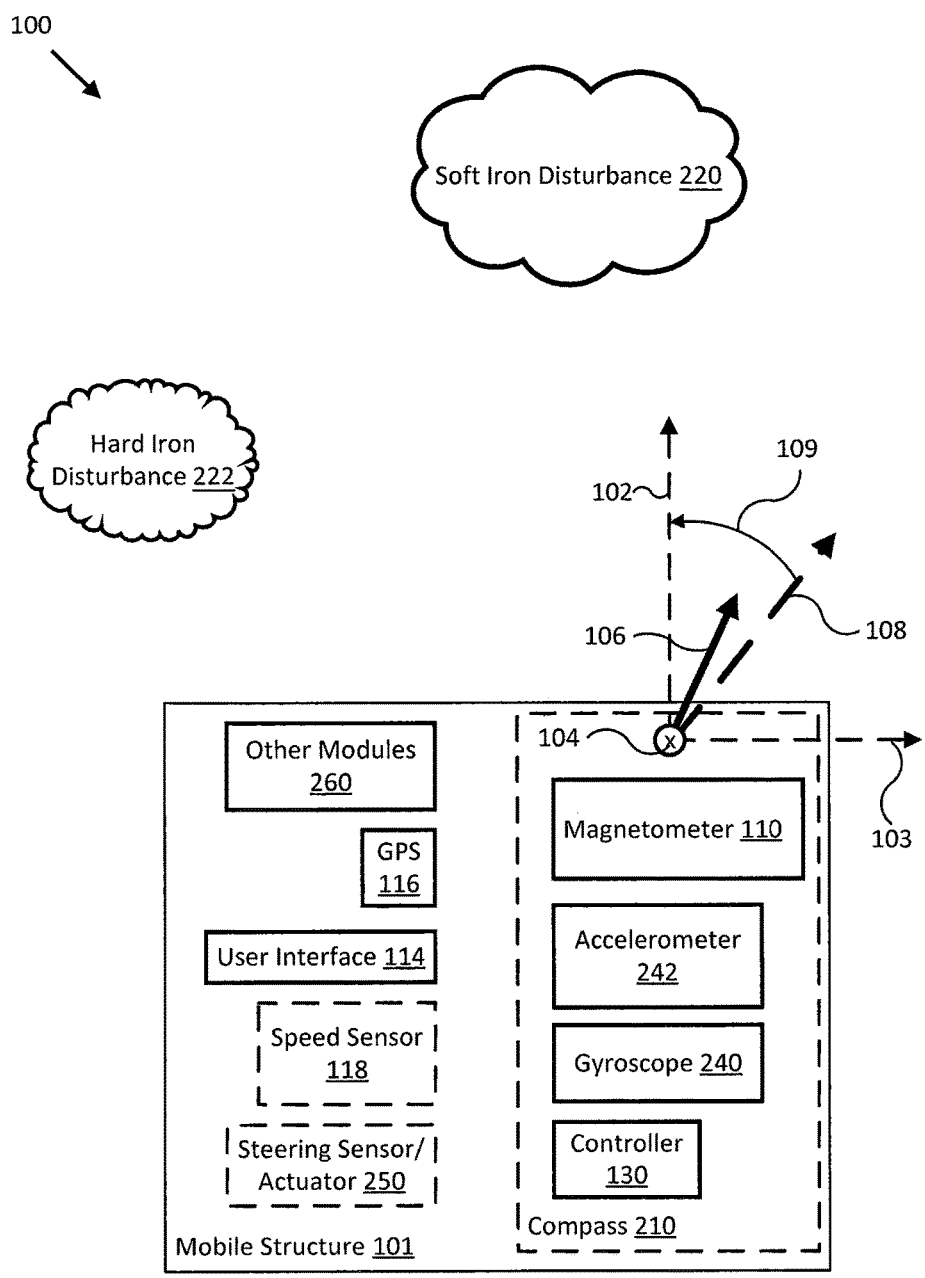
FIG. 1 illustrates a block diagram of a compass calibration system in accordance with an embodiment of the disclosure.

In accordance with various embodiments of the present disclosure, automatic compass calibration systems and methods may advantageously include a magnetometer in conjunction with a gyroscope and accelerometer providing measurements of angular velocities and linear accelerations of a mobile structure disposed within a magnetic field measured by the magnetometer. For example, the accelerometer and/or gyroscope may be mounted to or within the mobile structure, or may be integrated with the magnetometer. By selectively correlating angular velocity and acceleration measurements with measurements of a local magnetic field, embodiments of the present disclosure can quickly develop a robust, accurate, and adaptable calibration parameter space without the need for a manually controlled calibration environment. Such calibration space may be used to compensate for fixed and/or movable hard and/or soft iron disturbances to the local magnetic field.

To explain further, a compass is subject to errors introduced by the local magnetic environment. Where the local magnetic disturbance is part of the structure to which the compass is mounted, it is possible to correct for the disturbance. For many years, ship's compasses were corrected only for hard iron disturbance by placing a weak compensating magnet sufficiently close to the compass to cancel the ship's hard iron magnetics. Subsequently, Lord Kelvin invented soft iron correction for iron clad ships, placing a pair of "Kelvin's balls" to either side of the binnacle, at a distance adjusted to compensate for the effect of the iron, which was guiding the earth's magnetism fore-aft, creating a N-S magnet along the fore aft axis of the ship.

Since the advent of the electronic ship's compass, it has been possible to electronically correct for hard and soft iron. The user is required to press a button, and then circle the ship through 360°. The resulting field then traces a portion of a spherical surface in space, offset from the origin by the hard iron distortion, and squashed from a sphere into an ellipsoid by the soft iron distortion. The maneuver is done in calm water with the ship upright, and the correction is in 2 dimensions (conventionally, there is no visibility of any vertical hard or soft iron distortion). If the ship heels or pitches, the resulting error is not corrected. Additionally, it has not been possible to run an automatic compass correction continuously because a ship's motion at sea disturbs the gimbal, which introduces further correction errors, and because there has been no way to separate the combined effects of 2D and 3D error signals.

More recently, nine-axis hardware has eliminated the gimbal and made it possible to perform a rough 3D correction. However it has not been possible to do this continuously because of the difficulties involved in obtaining a sufficiently rich data set and in processing the data to correctly determine the disturbing field parameters. So, users have still been required to press a button and perform a circle. This invention substantially eliminates the need for user intervention, and obtains a continuous compass calibration/correction.

FIG. 1 illustrates a block diagram of a compass calibration system 100 in accordance with an embodiment of the disclosure. In the embodiment shown in FIG. 1, system 100 may be implemented to provide compass calibration for a particular type of mobile structure 101, such as a smart phone, a terrestrial robot, an aerial drone, a motorboat, a sailboat, an automobile, an airplane, and/or other types of mobile structures. System 100 may also be implemented to provide automatic compass calibration for a variety of other types of mobile platforms including a compass or other device used to measure magnetic fields.

In one embodiment, system 100 may include one or more of a magnetometer 110 (e.g., physically coupled to, integrated with, and/or otherwise fixed relative to accelerometer 242 and gyroscope 240 through use of a housing or other structure of compass 210 and/or mobile structure 101), a gyroscope 240, an accelerometer 242, a user interface 114, a controller 130, and one or more other sensors and/or actuators, such as a global positioning satellite system (GPS) 116, a speed sensor 118, a steering sensor/actuator 250, and/or other modules 260. In some embodiments, each of magnetometer 110, gyroscope 240, accelerometer 242, and/or controller 130 may be implemented in a combined housing or structure, referred to as compass 210. In further embodiments, one or more components of system 100 may be implemented within a common housing.

In various embodiments, system 100 may be adapted to measure local magnetic field 106 (e.g., three dimensional direction and magnitude), which may be influenced by hard iron disturbance 222 and/or soft iron disturbance 220, and corresponding environmental conditions. System 100 may then use these measurements to determine a corresponding corrected magnetic field 108 (e.g., three dimensional direction and magnitude) and/or heading angle 109, for example, that accurately and adaptively compensates for hard iron disturbance 222, soft iron disturbance 220, and/or other motion and/or orientation related disturbances influencing local magnetic field 106. In various embodiments, corrected magnetic field 108 may correspond to the Earth's magnetic field, measured at the position of magnetometer 110. System 100 may be adapted to calibrate compass 210 without necessitating a manually controlled calibration environment.

Directions 102, 103, and 104 describe one possible coordinate frame of compass 210 (e.g., of magnetic fields measured by magnetometer 110, accelerations measured by accelerometer 242, and/or angular velocities measured by gyroscope 240). As shown in FIG. 1, direction 102 illustrates a direction that may be substantially parallel to and/or aligned with a longitudinal axis of mobile structure 101 and/or compass 210, direction 103 illustrates a direction that may be substantially parallel to and/or aligned with a lateral axis of mobile structure 101 and/or compass 210, and direction 104 illustrates a direction that may be substantially parallel to and/or aligned with a vertical axis of mobile structure 101 and/or compass 210, as described herein. The various directions may describe one possible coordinate frame of mobile structure 101.

For example, a roll component of motion of compass 210 and/or mobile structure 101 may correspond to rotations around direction 102, a pitch component may correspond to rotations around direction 103, and a yaw component may correspond to rotations around direction 104. Heading angle 109 may correspond to the angle between a projection of corrected magnetic field 108 onto a horizontal plane (e.g., referenced to a gravitationally defined "down" vector) and a projection of direction 102 onto the same horizontal plane. In some embodiments, the projection of corrected magnetic field 108 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" magnetic field, or an "absolute" orientation).

Each of magnetometer 110, gyroscope 240, accelerometer 242, user interface 114, GPS 116, speed sensor 118, controller 130, steering sensor/actuator 250, and one or more other modules 260 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing automatic compass calibration, for example, or for transmitting and/or receiving communications, such as sensor signals, sensor information, and/or control signals, between one or more devices of system 100. In one embodiment, such method may include instructions to determine corrected magnetic field 108 from various sensor signals, determine heading 109 from corrected magnetic field 108, and/or determine calibration parameters for determining corrected magnetic field 108, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of magnetometer 110, gyroscope 240, accelerometer 242, user interface 114, GPS 116, speed sensor 118, controller 130, steering sensor/actuator 250, and one or more other modules 260 may be implemented with one or more amplifiers, modulators, phase adjusters, beamforming components, digital to analog converters (DACs), analog to digital converters (ADCs), various interfaces, antennas, and/or other analog and/or digital components enabling each of the devices of system 100 to transmit and/or receive signals, for example, in order to facilitate wired and/or wireless communications between one or more devices of system 100. Such components may be integrated with a corresponding device of system 100, for example. In some embodiments, the same or similar components may be used to perform one or more sensor measurements, as described herein.

Sensor signals, control signals, and other signals may be communicated among devices of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each device of system 100 may include one or more modules supporting wired, wireless, and/or a combination of wired and wireless communication techniques.

Magnetometer 110 may be implemented as one or more suspended magnets, hall effect magnetometers, magnetoresistive devices, fluxgate magnetometers, semiconductor-based magnetometers, and/or other device capable of measuring magnetic fields (e.g., magnitude and direction, relative to a position, orientation, and/or motion of magnetometer 110, compass 210, and/or mobile structure 101) substantially local to magnetometer 110 and/or mobile structure 101 and providing such measurements as sensor signals communicated to various devices of system 100. As noted herein, magnetometer 110 may be implemented with an antenna, a logic device, and/or other analog and/or digital components enabling magnetometer 110 to provide, receive, and process sensor signals and communicate with one or more devices of system 100. Further, a logic device of magnetometer 110 may be adapted to perform any of the methods described herein.

Gyroscope 240 may be implemented as an electronic sextant, semiconductor device, integrated chip, or other device capable of measuring angular velocities of magnetometer 110, compass 210, and/or mobile structure 101 and providing such measurements as sensor signals that may be communicated to other devices of system 200 (e.g., user interfaces 114, controller 130). Gyroscope 240 may be adapted to measure angular velocities in relation to a coordinate frame of magnetometer 110 (e.g., a coordinate frame of the magnetic fields measured by magnetometer 110).

Accelerometer 242 may be implemented as one or more accelerometer sensors, accelerometer sensor systems, and/or other devices capable of measuring linear accelerations (e.g., direction and magnitude) of magnetometer 110, compass 210, and/or mobile structure 101, and providing such measurements as sensor signals communicated to various devices of system 100. Accelerometer 242 may be adapted to measure accelerations in relation to a coordinate frame of magnetometer 110 (e.g., a coordinate frame of the magnetic fields measured by magnetometer 110).

As shown in FIG. 1, accelerometer 242 may be located substantially near, on, or within a housing for compass 210. In some embodiments, accelerometer 242 may be integrated with compass 210 and/or magnetometer 110, for example, or may be integrated onto a printed circuit board (PCB) of compass 210 to reduce system complexity, manufacturing costs, power requirements, and/or timing errors between measurements of magnetic fields and accelerations. For example, magnetometer 110 and accelerometer 242 may be configured to share one or more components, such as a memory, a logic device, a communications module, and/or other components, and such sharing may act to reduce and/or substantially eliminate such timing errors while reducing overall system complexity and/or cost.

In various embodiments, a logic device (e.g., of magnetometer 110, accelerometer 242, and/or other devices of system 100) may be adapted to determine parameters (e.g., using signals from various devices of system 100) for transforming a coordinate frame of accelerometer 242 and/or gyroscope 240 to/from a coordinate frame of magnetometer 110, a coordinate frame of mobile structure 101, at-rest and/or in-motion, and/or other coordinate frames, as described herein. One or more logic devices of system 100 may be adapted to use such parameters to transform a coordinate frame of accelerometer 242 to/from a coordinate frame of magnetometer 110 and/or mobile structure 101, for example. Furthermore, such parameters may be used to determine and/or calculate one or more adjustments to an orientation of accelerometer 242 that would be necessary to physically align a coordinate frame of accelerometer 242 with a coordinate frame of magnetometer 110 and/or mobile structure 101. Adjustments determined from such parameters may be used to selectively power adjustment servos (e.g., of compass 210), for example, or may be communicated to a user through user interface 114, as described herein.

User interface 114 may be implemented as a display, a touch screen, a keyboard, a mouse, a joystick, a knob, a steering wheel, a ship's wheel, a yolk, and/or any other device capable of accepting user input and/or providing feedback to a user. In various embodiments, user interface 114 may be adapted to provide user input (e.g., as a type of signal and/or sensor information) to other devices of system 100, such as magnetometer 110 and/or controller 130.

User interface 114 may be implemented with one or more logic devices that may be adapted to execute instructions, such as software instructions, implementing any of the various processes and/or methods described herein. For example, user interface 114 may be adapted to form communication links, transmit and/or receive communications (e.g., sensor signals, control signals, sensor information, user input, and/or other information), determine corrected magnetic fields, adjust positions and/or orientations of compass 210, determine parameters for one or more coordinate frame transformations, and/or perform coordinate frame transformations, for example, or to perform various other processes and/or methods.

In various embodiments, user interface 114 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of compass 210, and/or to otherwise facilitate operation of system 100 and devices within system 100. Once user interface 114 accepts a user input, the user input may be transmitted to other devices of system 100 over one or more communication links.

In one embodiment, user interface 114 may be adapted to receive a sensor signal (e.g., from magnetometer 110 and/or accelerometer 242) over communication links formed by one or more associated logic devices, for example, and display sensor information corresponding to the received sensor signal to a user. In related embodiments, user interface 114 may be adapted to process sensor signals to determine sensor information. For example, a sensor signal may include a magnetic field, an angular velocity, and/or an acceleration of mobile structure 101. In such embodiment, user interface 114 may be adapted to process the sensor signals to determine sensor information indicating a motion compensated acceleration of mobile structure 101, for example, and/or indicating stabilized roll and pitch components of an orientation of mobile structure 101.

In some embodiments, user interface 114 may be adapted to accept user input including a user-defined heading for mobile structure 101, for example, and to generate control signals for steering sensor/actuator 250 to cause mobile structure 101 to steer towards the user-defined heading. More generally, user interface 114 may be adapted to display sensor information to a user, for example, and/or to transmit sensor information and/or user input to other user interfaces, sensors, or controllers of system 100, for instance, for display and/or further processing.

GPS 116 may be implemented as a global positioning satellite receiver, a global navigation satellite system (GNSS) receiver, and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 116 may be adapted to determine a velocity of mobile structure 101 (e.g., using a series of position measurements), such as an absolute velocity of mobile structure 101. In various embodiments, one or more logic devices of system 100 may be adapted to determine a speed of mobile structure 101 from such velocity.

Speed sensor 118 may be implemented as an electronic pitot tube, metered gear or wheel, water speed sensor, wind speed sensor, and/or other device capable of measuring a linear speed of mobile structure 101 (e.g., in a surrounding medium and/or aligned with a longitudinal axis of mobile structure 101) and providing such measurements as sensor signals communicated to various devices of system 100.

As noted herein, GPS 116 and/or speed sensor 118 may be implemented with antennas, logic devices, and/or other analog and/or digital components enabling GPS 116 and/or speed sensor 118 to interface with, provide signals, receive signals, and otherwise communicate with one or more devices of system 100.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of compass 210 and/or mobile structure 101, for example. Such software instructions may also implement methods for processing sensor signals, determining sensor information, providing user feedback (e.g., through user interface 114), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 114. In some embodiments, controller 130 may be integrated with one or more user interfaces (e.g., user interface 114), and, in one embodiment, may share a communication module or modules. As noted herein, controller 130 may be adapted to execute one or more control loops for steering control (e.g., through steering actuator 250), collision avoidance, and/or performing other various operations of mobile structure 101. In some embodiments, a control loop may include processing sensor signals and/or sensor information in order to control one or more operations of mobile structure 101.

Steering sensor/actuator 250 may be adapted to sense and/or physically adjust a steering mechanism for mobile structure 101 according to one or more control signals (e.g., a steering demand) provided by controller 130. Steering sensor/actuator 250 may be physically coupled to a rudder or other type of steering mechanism of mobile structure 101, for example, and may be adapted to physically adjust the rudder to a variety of positive and/or negative steering angles.

Other modules 260 may include other and/or additional sensors, actuators, communications modules/nodes, and/or user interface devices used to provide additional environmental information of mobile structure 101, for example. In some embodiments, other modules 260 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 200 (e.g., controller 130) to provide operational control of mobile structure 101 that compensates for environmental conditions, such as wind speed and/or direction, swell speed, amplitude, and/or direction, and/or an object in a path of mobile structure 101, for example.

Each device of system 100 may include one or more batteries or other electrical power storage devices, for example, and may include one or more solar cells or other electrical power generating devices (e.g., a wind or water-powered turbine, or a generator producing electrical power from motion of one or more components of system 100). In some embodiments, one or more of the devices may be powered by a power source for mobile structure 101, using one or more power leads.

By locating magnetometer 110, accelerometer 242, and gyroscope 240 near or within compass 210, embodiments of the present disclosure provide measurements of accelerations and angular velocities of magnetometer 110 and/or compass 210 that are accurate substantially to the limit of accuracy of the accelerometer and gyroscope used to implement accelerometer 242 and gyroscope 240, respectively. Further, magnetic field measurements may be made, transmitted, and/or stored at substantially the same time and/or using substantially the same components as those used for acceleration and/or angular velocity measurements, thus substantially eliminating errors due to measurement timing mismatches. For example, in one embodiment, a logic device of compass 210 may be adapted to provide measurements of magnetic fields, angular velocities, and accelerations as sensor signals communicated to various devices of system 100. Conventional methods to overcome measurement timing errors, particularly in real-time, typically require substantial increases in system complexity and/or power usage related to increasing communication bandwidths and/or sensor sampling rates. Thus, embodiments of the present disclosure provide substantial benefits over conventional systems in terms of increased accuracy, lower system complexity, lower power requirements, and lower overall cost.

Figure 2:
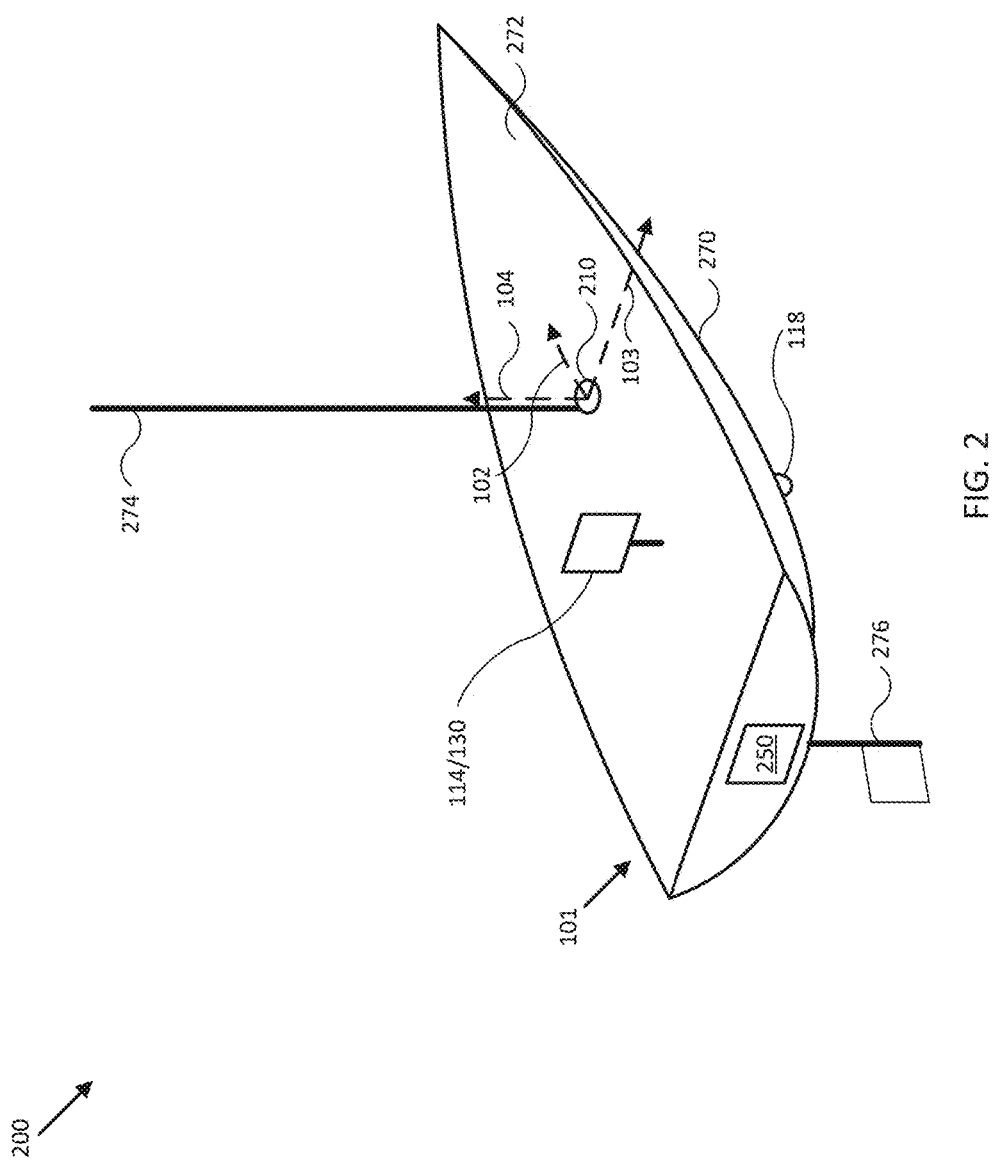
FIG. 2 illustrates a diagram of a compass calibration system in accordance with an embodiment of the disclosure.

FIG. 2 illustrates a diagram of a compass calibration system 200 in accordance with an embodiment of the disclosure. In the embodiment shown in FIG. 2, system 200 may be implemented to provide automatic compass calibration for mobile structure 101, similar to system 100 of FIG. 1. For example, system 200 may include compass 210 (e.g., magnetometer 110, gyroscope 240, accelerometer 242), user interface/controller 114/130, steering sensor/actuator 250, and various other sensors and/or actuators. In the embodiment illustrated by FIG. 2, mobile structure 101 is implemented as a sail boat including a hull 270, a deck 272, a mast 274, and a rudder 276. In other embodiments, hull 270, deck 272, mast 274, and rudder 276 may correspond to attributes of a passenger automobile or other type of vehicle, robot, or drone, for example, such as an undercarriage, a passenger compartment, an engine compartment, a trunk, a roof, a steering mechanism, and/or other portions of a vehicle.

In one embodiment, user interface 114 may be mounted to mobile structure 101 substantially on deck 272 and/or mast 274. Such mount may be fixed, for example, or may include gimbals and other leveling mechanisms so that a display of user interface 114 stays substantially level with respect to a horizon and/or a "down" vector. In another embodiment, user interface 114 may be located in proximity to mobile structure 101 and be mobile throughout a user level (e.g., deck 272) of mobile structure 101. For example, user interface 114 may be implemented with a lanyard and/or other type of strap and/or attachment device and be physically coupled to a user of mobile structure 101 so as to be in proximity to mobile structure 101. In various embodiments, user interface 114 may be implemented with a relatively thin display that is integrated into a PCB of the corresponding user interface in order to reduce size, weight, housing complexity, and/or manufacturing costs.

As shown in FIG. 2, in some embodiments, speed sensor 118 may be mounted to a portion of mobile structure 101 substantially below a typical user level, such as to hull 270, and be adapted to measure a relative water speed. Speed sensor 118 may be adapted to provide a thin profile to reduce and/or avoid water drag. Speed sensor 118 may include one or more batteries and/or other electrical power storage devices, for example, and may include one or more water-powered turbines to generate electrical power. In other embodiments, speed sensor 118 may be powered by a power source for mobile structure 101, for example, using one or more power leads penetrating hull 270.

In the embodiment illustrated by FIG. 2, mobile structure 101 includes direction/longitudinal axis 102, direction/lateral axis 103, and direction/vertical axis 104 meeting approximately at mast 274 (e.g., near a center of gravity of mobile structure 101). In one embodiment, the various axes may define a coordinate frame of mobile structure 101 and/or compass 210. Each sensor device adapted to measure a direction (e.g., velocities, accelerations, magnetic fields, or other states including a directional component) may be implemented with a mount, actuators, and/or servos that can be used to align a coordinate frame of the sensor device with a coordinate frame of any device of system 100 and/or mobile structure 101. Each device may be located at positions different from those depicted in FIG. 2. Each device of system 200 may include one or more batteries or other electrical power storage devices, for example, and may include one or more solar cells or other electrical power generating devices. In some embodiments, one or more of the devices may be powered by a power source for mobile structure 101.

Figure 3:
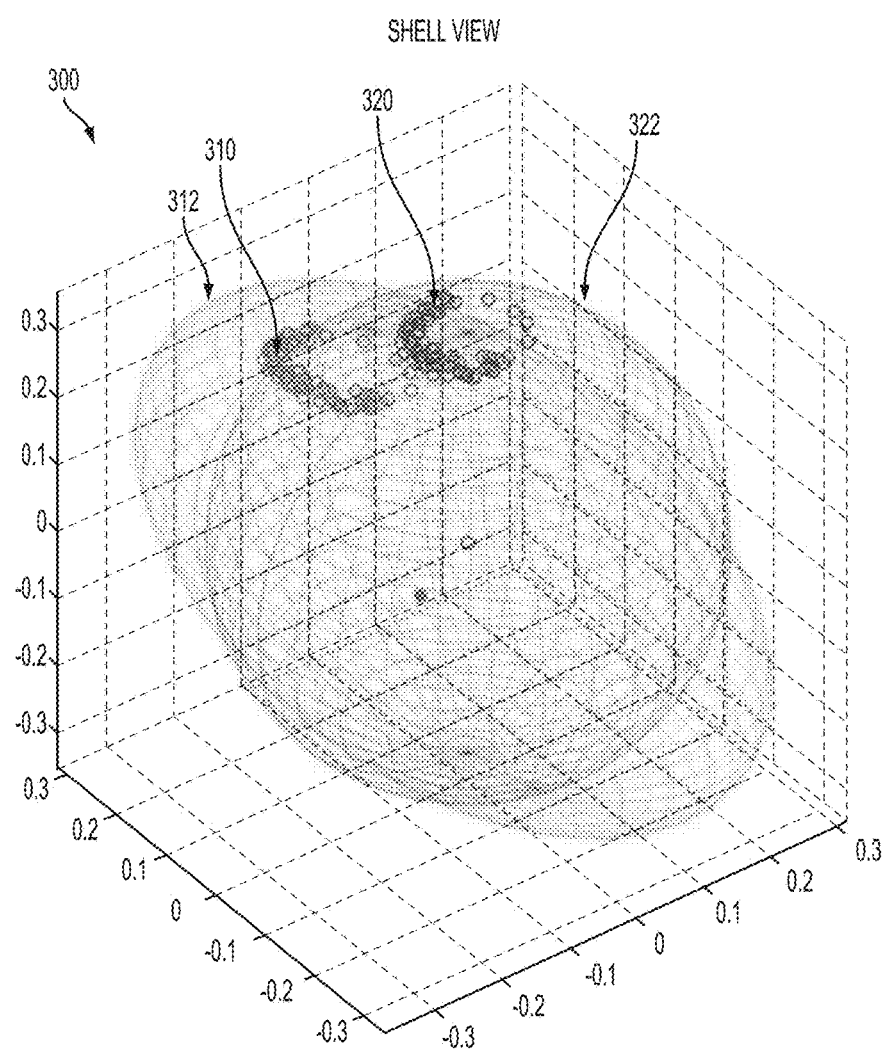
FIG. 3 illustrates a graph of magnetic fields in accordance with an embodiment of the disclosure.
Figure 4:
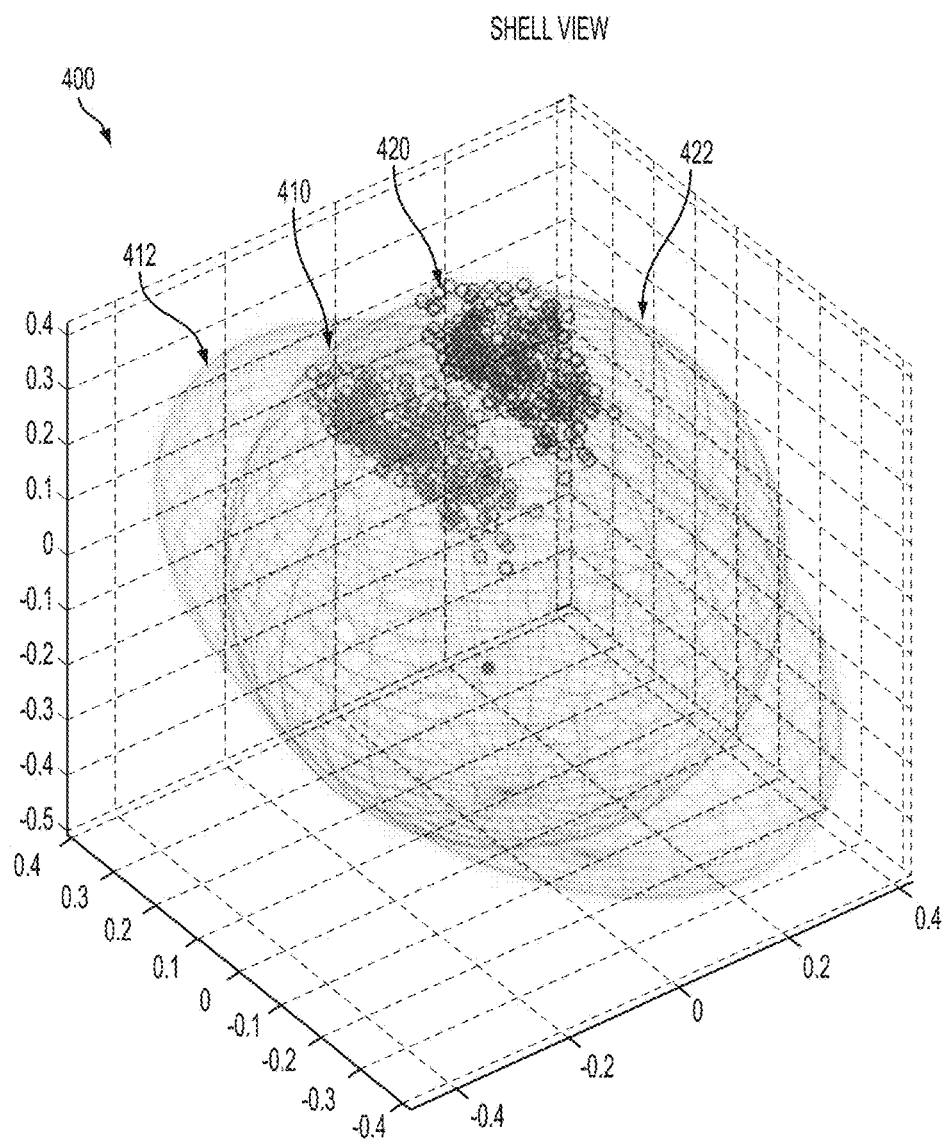
FIG. 4 illustrates a graph of magnetic fields in accordance with an embodiment of the disclosure.
Figure 5:
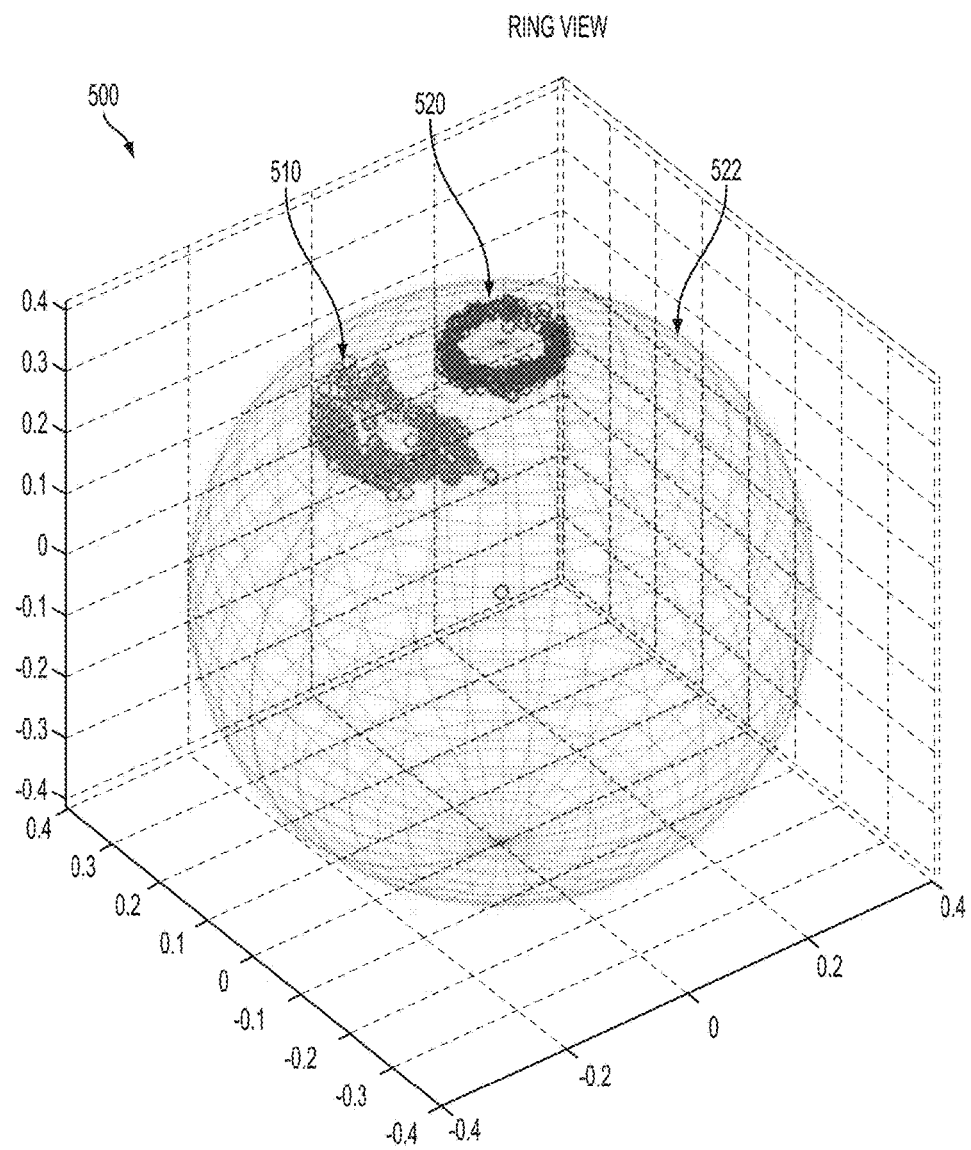
FIG. 5 illustrates a graph of magnetic fields in accordance with an embodiment of the disclosure.

FIGS. 3-5 illustrate the types of magnetic fields and disturbances experienced by typical mobile structures including a compass.

FIG. 3 illustrates a graph 300 of magnetic fields in accordance with an embodiment of the disclosure. Graph 300 shows plot 310 including a number of measurements of a local magnetic field influenced by hard and soft iron disturbances, as illustrated by offset ellipsoid 312 (e.g., plot 310 is substantially on the surface of offset ellipsoid 312). Plot 320 includes a similar number of measurements of a local magnetic field with no hard or soft disturbances, as illustrated by centered sphere 322, such that the local magnetic field substantially corresponds to the earth's magnetic field and/or a corrected magnetic field. Measurements corresponding to plots 310 and 320 were made by a compass (e.g., and corresponding mobile structure) experiencing substantially no roll or pitch. Notably, plots 310 and 320 are both substantially ring-shaped.

Eight offset ellipsoid parameters characterizing ellipsoid 312 may be determined. Applying the inverse of the parameters then straightens and centers the ellipsoid gives a corrected magnetic vector. However, in practice, the typical least squares adjustment process is ill conditioned for a typical data set that can realistically be collected from a ship. An ideal data set would contain 360° of yaw, 360° of roll and 360° of pitch, and with such a data set, existing methods would indeed work. Whilst it is easy to obtain a real data set with 360° of yaw, pitch and roll are often limited to 10°. As can be seen from FIG. 3, many ellipsoids could provide an apparently good fit to plot 310; there is no single right answer or reliably attainable global minimum in a conventional characterization process. Indeed, a similar example is provided in FIG. 4 for a case with real-world roll and pitch, and there is still no clear characterization because the data set is insufficiently rich.

FIG. 4 illustrates a graph 400 of magnetic fields in accordance with an embodiment of the disclosure. Graph 400 shows plot 410 including a number of measurements of a local magnetic field influenced by hard and soft iron disturbances, as illustrated by offset ellipsoid 412. Plot 420 includes a similar number of measurements of a local magnetic field with no hard or soft disturbances, as illustrated by centered sphere 422. Measurements corresponding to plots 410 and 420 were made by a compass (e.g., and corresponding mobile structure) experiencing substantially no roll or pitch. Notably, neither of plots 410 and 420 is ring-shaped, and neither provides a data set rich enough to reliably determine calibration parameters between plot 410 and 420. Put differently, the difference between the two plots is not clear enough to drive a least squares algorithm reliably to the correct answer, given that real data contains noise, has limited precision, and is limited in quantity by available system memory, computational power, time, and other system resources.

To create a practical algorithm, the magnetic vector should be roll and pitch corrected, and the subsequent data should be fit to an appropriately determined ring rather than to a shell. FIG. 5 provides the same set of measurements in FIG. 4, but after roll and pitch correction. FIG. 5 illustrates a graph 500 of magnetic fields in accordance with an embodiment of the disclosure. Graph 500 shows plot 510 including a number of measurements of a local magnetic field influenced by hard and soft iron disturbances, but roll and pitch corrected. Plot 520 includes a similar number of measurements of a local magnetic field with no hard or soft disturbances, as illustrated by centered sphere 522, also roll and pitch corrected. Notably, both plots 510 and 520 are substantially ring-shaped.

Thus, from FIGS. 3-5, a more reliable shape to fit a selection of disturbed magnetic field data to a circle centered on the origin, where all points lie as close as possible to a circle (which can have any particular radius or height). Put differently, the variance of the height and radius of the points must be minimized. For very far north/south locations where the earth's field is almost vertical, or for mobile structures where the disturbing field is very large (e.g., larger than the horizontal component of the earth's magnetic field), the uncorrected circle no longer encloses the origin (as shown). In this case, minimizing the vertical and radial variance is not enough, and so it is also useful to ensure that the circle is centered close to the origin. An appropriately constructed cost function can ensure such limitations. Once constructed, the cost function can be minimized (e.g., using a least squares method, such as that disclosed herein) to provide the appropriate calibration parameters for an offset vector H and stretch/compress matrix S that can be combined with the uncorrected measured local magnetic field to produce a corrected magnetic field.

The vertical terms of the offset vector H and stretch/compress matrix S (e.g., H3 and S33) are almost always ill-conditioned in any practical ship motion scenario at extreme northern/southern latitudes, and so, in some embodiments, a further term may be used to prevent wild vertical correction parameters developing which is (H3$^2$+ S33$^2$). It is then possible to construct a robust cost function, i.e. one which provides a clear 'downhill direction' for least squared adjustment, substantially globally.

Figure 6:
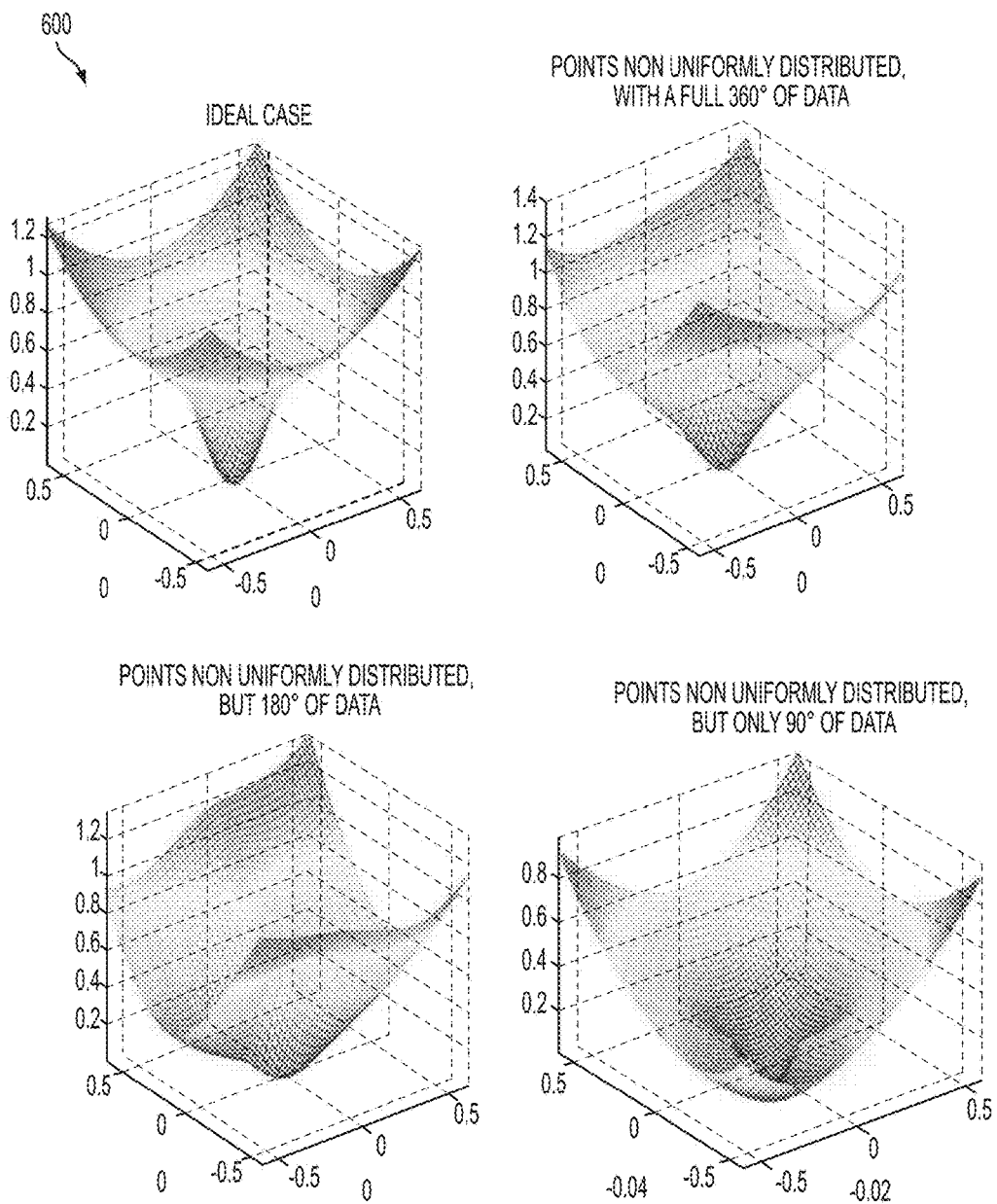
FIG. 6 illustrates graphs of a cost function in accordance with embodiments of the disclosure.

FIG. 6 illustrates graphs 600 of a cost function in accordance with embodiments of the disclosure. In FIG. 6, an appropriate cost function is shown for increasingly difficult data sets. The ideal data set is top left, uniform and complete with 360° of yaw data evenly distributed. Top right, the data set is not uniform, i.e. there are more points collected on some headings than on others. Bottom left there are only 180° of yaw data available, and bottom right there are only 90° of yaw data available. Notably, each graph shows a relatively pronounced global minimum, and this global minimum can be reached relatively reliably without a need to a controlled calibration environment, as shown.

As can be seen from FIG. 6, ring fitting is extremely successful under less than optimum conditions, and can still benefit from rich and accurate data sets even though they aren't required to reach an accurate calibration. In some embodiments, data measurements may occur at approximately 100 Hz (e.g., or as low 10 Hz or as high as 500 Hz, depending on system resources), and so there typically are vast quantities of data available. Because data storage capacity may be limited, it is typically important to only store calibration points (e.g., and/or their corresponding environmental state variables) that are sufficiently accurate and contribute to enriching the data set. Lack of accuracy can arise when the external magnetic environment is temporarily corrupted by nearby metal objects (e.g., lock's, steel ships) or other environmental changes (the vessel travels across the globe).

In some embodiments, new calibration points are stored only when the magnetic field is sufficiently different from the last point stored. This can be a 5 dimensional comparison including the local magnetic field (in vector form) and the corresponding roll and pitch components of the mobile structure or compass. In other embodiments, new calibration points are stored only when the magnetic field's rate of change is consistent with the gyroscope inferred boat motion (i.e. there are no significant external field variations) and the boat speed is at or around cruising speed. In further embodiments, new calibration points are stored according to a particular combination of the above and/or according to other external and internal conditions, as described herein. In some embodiments, new calibration points overwrite old points which are close by so as to limit the use of memory. In still further embodiments, points may be aged so that no point survives for more than approximately 60 minutes, the time it takes to move into a significantly different magnetic environment whilst circumnavigating the globe at approximately 40 knots, or for a shorter or longer time period set by a user.

Figure 7A:
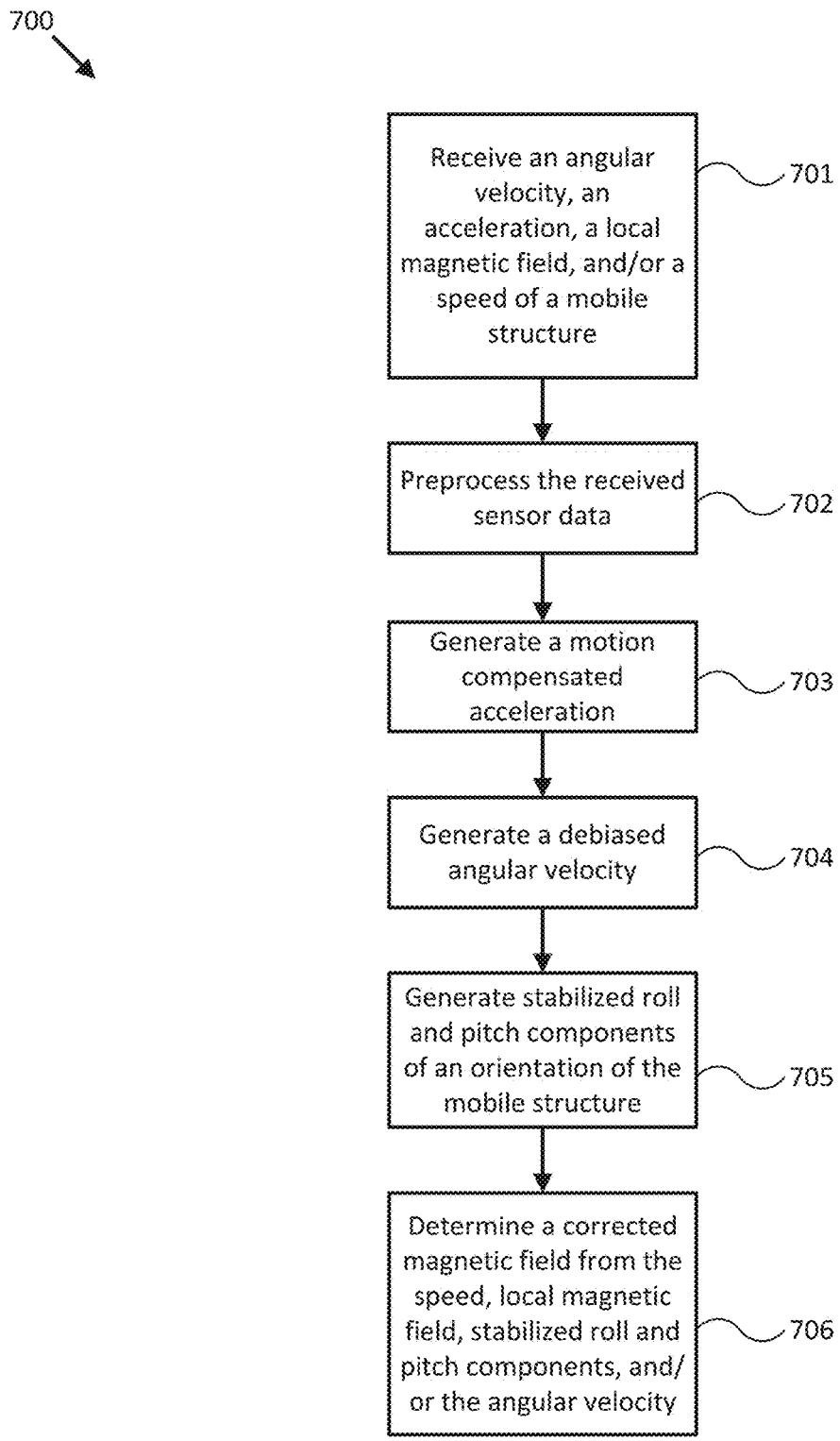
FIG. 7A illustrates a flow diagram of various operations to provide compass calibration in accordance with an embodiment of the disclosure.
Figure 7B:
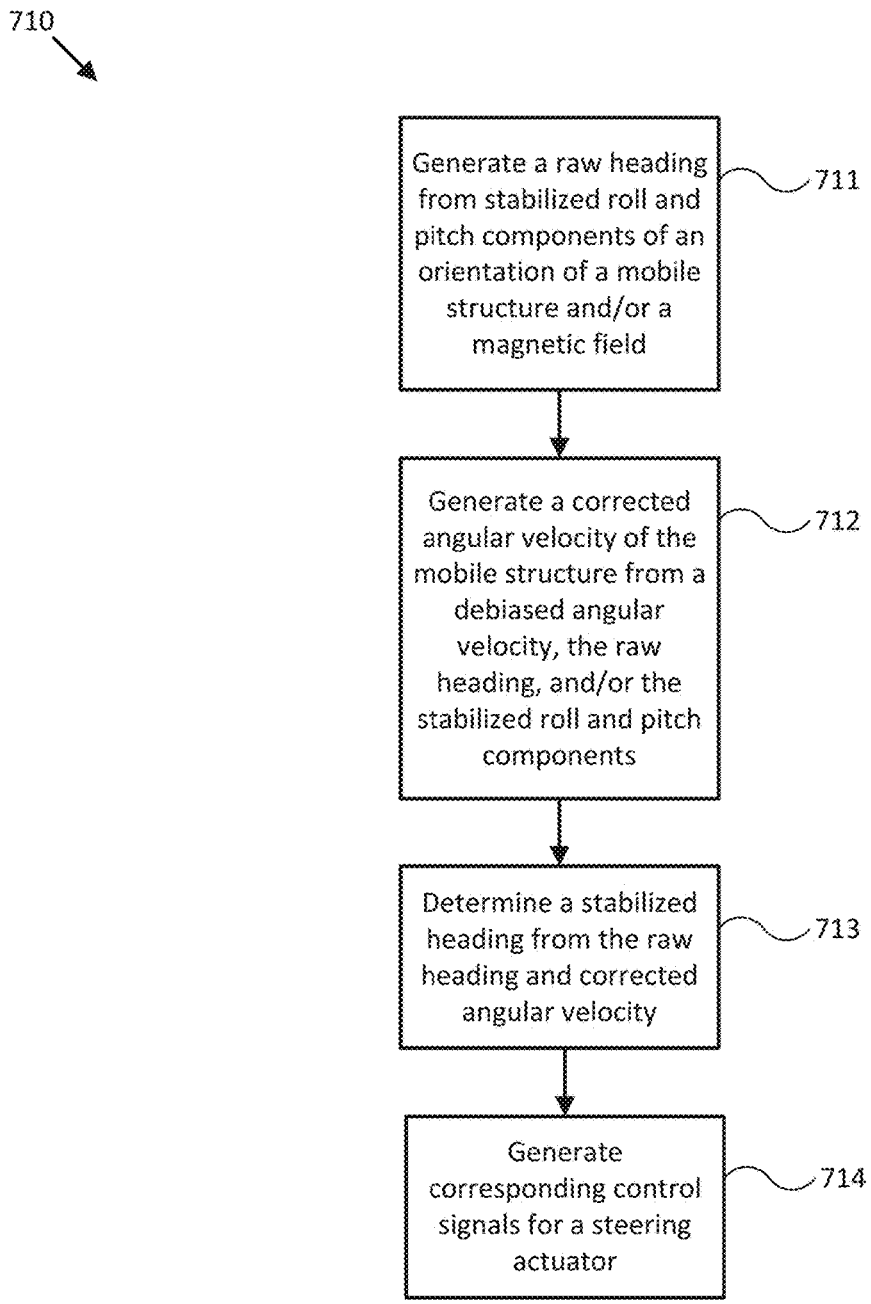
FIG. 7B illustrates a flow diagram of various operations to provide compass calibration in accordance with an embodiment of the disclosure.
Figure 7C:
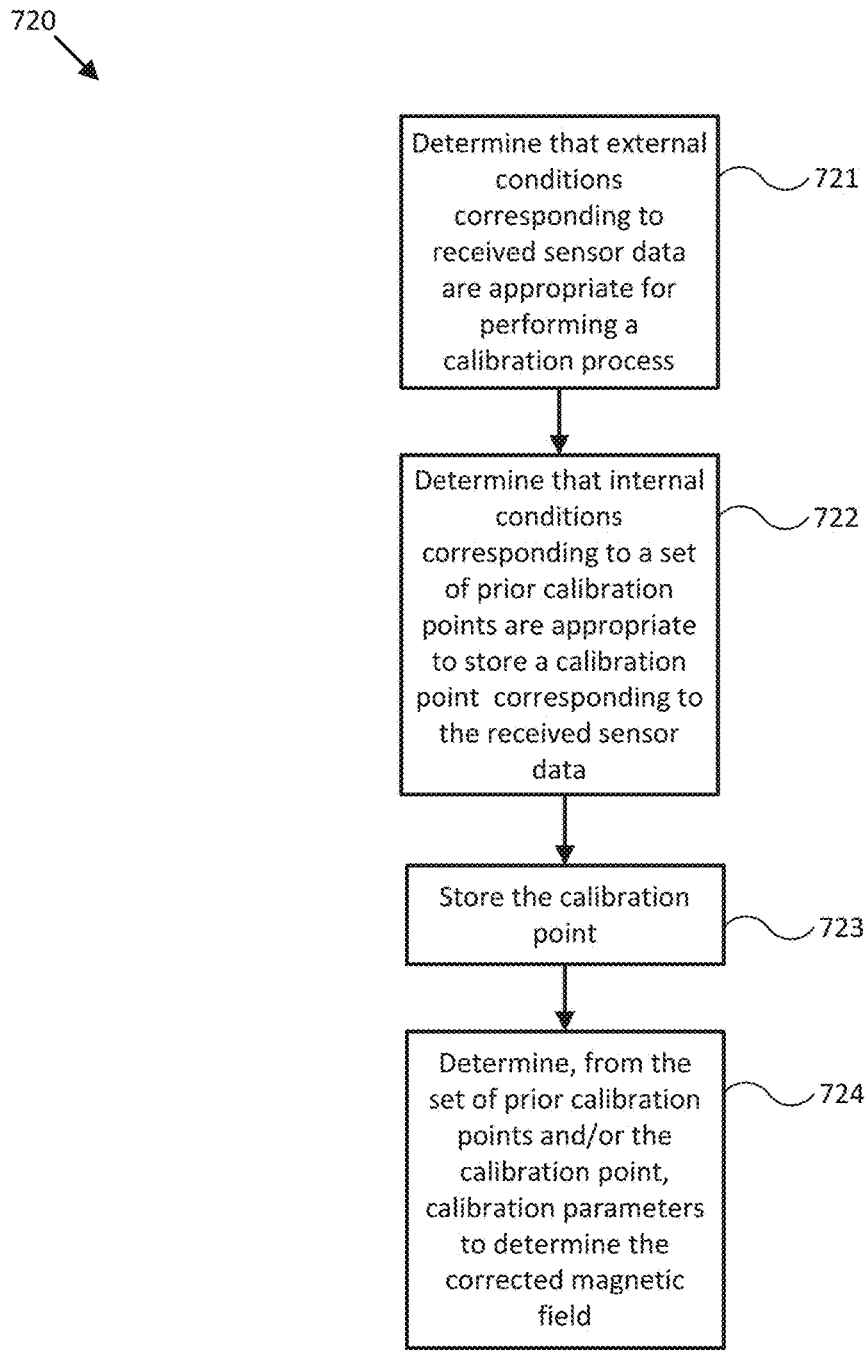
FIG. 7C illustrates a flow diagram of various operations to provide compass calibration in accordance with an embodiment of the disclosure.

FIGS. 7A-C illustrate flow diagrams of respective processes 700, 710, 720 to provide automatic compass calibration for compass 210 of mobile structure 101 in accordance with embodiments of the disclosure. In some embodiments, the operations of FIGS. 7A-C may be implemented as software instructions executed by one or more logic devices associated with corresponding electronic devices and/or sensors of system 100 of FIG. 1 and/or system 200 of FIG. 2. More generally, the operations of FIGS. 7A-C may be implemented with any combination of software instructions and/or electronic hardware (e.g., inductors, capacitors, amplifiers, or other analog and/or digital components).

It should be appreciated that any step, sub-step, sub-process, or block of processes 700, 710, 720 may be performed in an order or arrangement different from the embodiments illustrated by respective FIGS. 7A-C. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories of systems 100 and/or 200 prior to moving to a following portion of a corresponding process. Although processes 700, 710, 720 are described with reference to systems 100 and 200, processes 700, 710, 720 may be performed by other systems different from systems 100 and 200 and including a different selection of electronic devices, sensors, mobile structures, and/or mobile structure attributes.

Process 700 may represent a process for determining a corrected magnetic field from various sensor signals. In block 701, controller 130 receives an angular velocity, an acceleration, a local magnetic field, and/or a speed of mobile structure 101.

In block 702, controller 130 preprocesses the received sensor data. For example, a logic device of controller 130 may be adapted to range and/or slew rate limit the sensor signals received in block 701.

In block 703, controller 130 generates a motion compensated acceleration. For example, a logic device of controller 130 may be adapted to use the speed and derived yaw rates to compensate the accelerations and eliminate artifacts of fore/aft and turning acceleration on pitch and roll.

In block 704, controller 130 generates a debiased angular velocity. For example, a logic device of controller 130 may be adapted to use magnetic fields and accelerations to remove a DC bias from the gyroscope-derived angular velocities.

In block 705, controller 130 generates stabilized roll and pitch components of an orientation of the mobile structure. For example, a logic device of controller 130 may be adapted to determine gyroscope stabilized pitch and roll components from the accelerations instead of integrating the gyroscope-derived angular velocities and accumulating various calculation errors.

In block 706, controller 130 determines a corrected magnetic field from the speed, local magnetic field, stabilized roll and pitch components, and/or the angular velocity. For example, a logic device of controller 130 may be adapted to accumulate selected calibration points and perform a ring fit process, as described herein, to reliably and adaptively determine calibration parameters without requiring a controlled calibration environment.

Process 710 may represent a process for determining a stabilized heading for mobile structure 101. In block 711, controller 130 generate a raw heading from stabilized roll and pitch components of an orientation of mobile structure 101 and/or a magnetic field (e.g., local magnetic field 106 and/or corrected magnetic field 108). For example, a logic device of controller 130 may be adapted to project the magnetic fields onto a horizontal plane defined by stabilized roll and pitch components.

In block 712, controller 130 generates a corrected angular velocity of the mobile structure from a debiased angular velocity, the raw heading, and/or the stabilized roll and pitch components, as described herein. In block 713, controller 130 determines a stabilized heading from the raw heading and corrected angular velocity, as described herein. In block 714, controller 130 generates corresponding control signals for a steering actuator, as described herein.

Process 720 may represent a process for determining calibration parameters for compass 210, as described herein. In block 721, controller 130 determines whether external conditions corresponding to received sensor data are appropriate for performing a calibration process, as described herein. In block 722, controller 130 determines that internal conditions corresponding to a set of prior calibration points are appropriate to store a calibration point corresponding to the received sensor data, as described herein. In block 723, controller 130 stores the calibration point. In block 724, controller 130 determines, from the set of prior calibration points and/or the calibration point, calibration parameters to determine the corrected magnetic field, as described herein.

FIGS. 8-18 illustrate flow diagrams and/or control loops of respective processes 800-1800 to provide automatic compass calibration for compass 210 of mobile structure 101 in accordance with embodiments of the disclosure. In some embodiments, the operations of FIGS. 8-18 may be implemented as software instructions executed by one or more logic devices associated with corresponding electronic devices and/or sensors of system 100 of FIG. 1 and/or system 200 of FIG. 2. More generally, the operations of FIGS. 8-18 may be implemented with any combination of software instructions and/or electronic hardware (e.g., inductors, capacitors, amplifiers, or other analog and/or digital components).

It should be appreciated that any step, sub-step, sub-process, or block of processes 800-1800 may be performed in an order or arrangement different from the embodiments illustrated by respective FIGS. 8-18. For example, in other embodiments, one or more blocks and/or elements may be omitted from the various processes, and blocks and/or elements from one process may be included in another process. Furthermore, inputs, outputs, various sensor signals, sensor information, calibration parameters, and/or other operational parameters, constants, state variables or other information may be stored to one or more memories of systems 100 and/or 200 prior to moving to a following portion of a corresponding process. Although processes 800-1800 are described with reference to systems 100 and 200, processes 800-1800 may be performed by other systems different from systems 100 and 200 and including a different selection of electronic devices, sensors, mobile structures, and/or mobile structure attributes.

Figure 8:
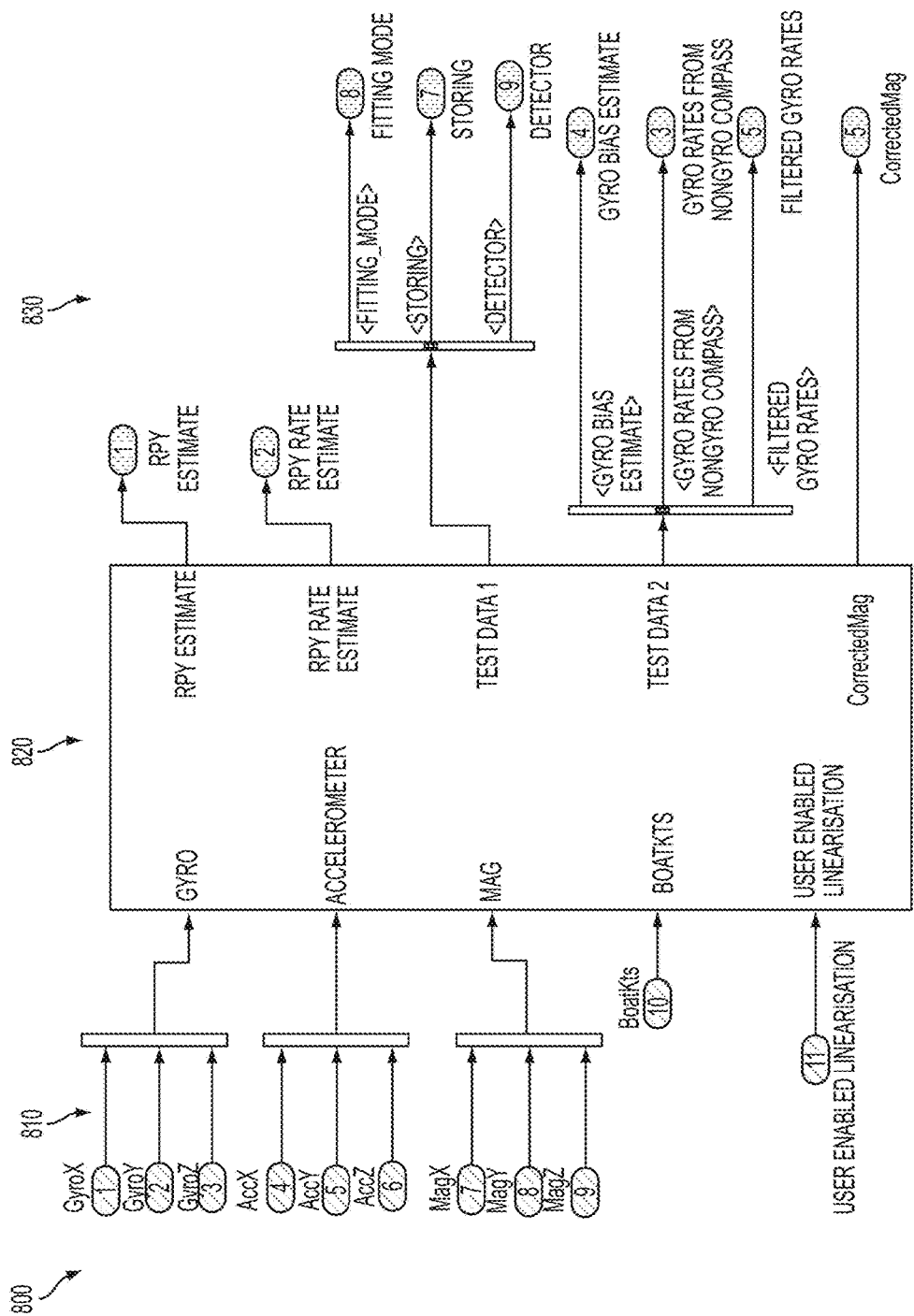
FIGS. 8-18 illustrate flow diagrams of various operations to provide compass calibration in accordance with embodiments of the disclosure.

Process 800 of FIG. 8 illustrates a top level view of a compass calibration process. In some embodiments, process 800 may include sensor inputs 810 (e.g., from gyroscope 240, accelerometer 242, magnetometer 110, speed sensor 118, and/or user interface 114), logic block 820 (e.g., expanded upon in FIGS. 9-18), and/or outputs 830 (e.g., estimate orientations and angular velocities, and corrected magnetic fields).

Figure 9A:
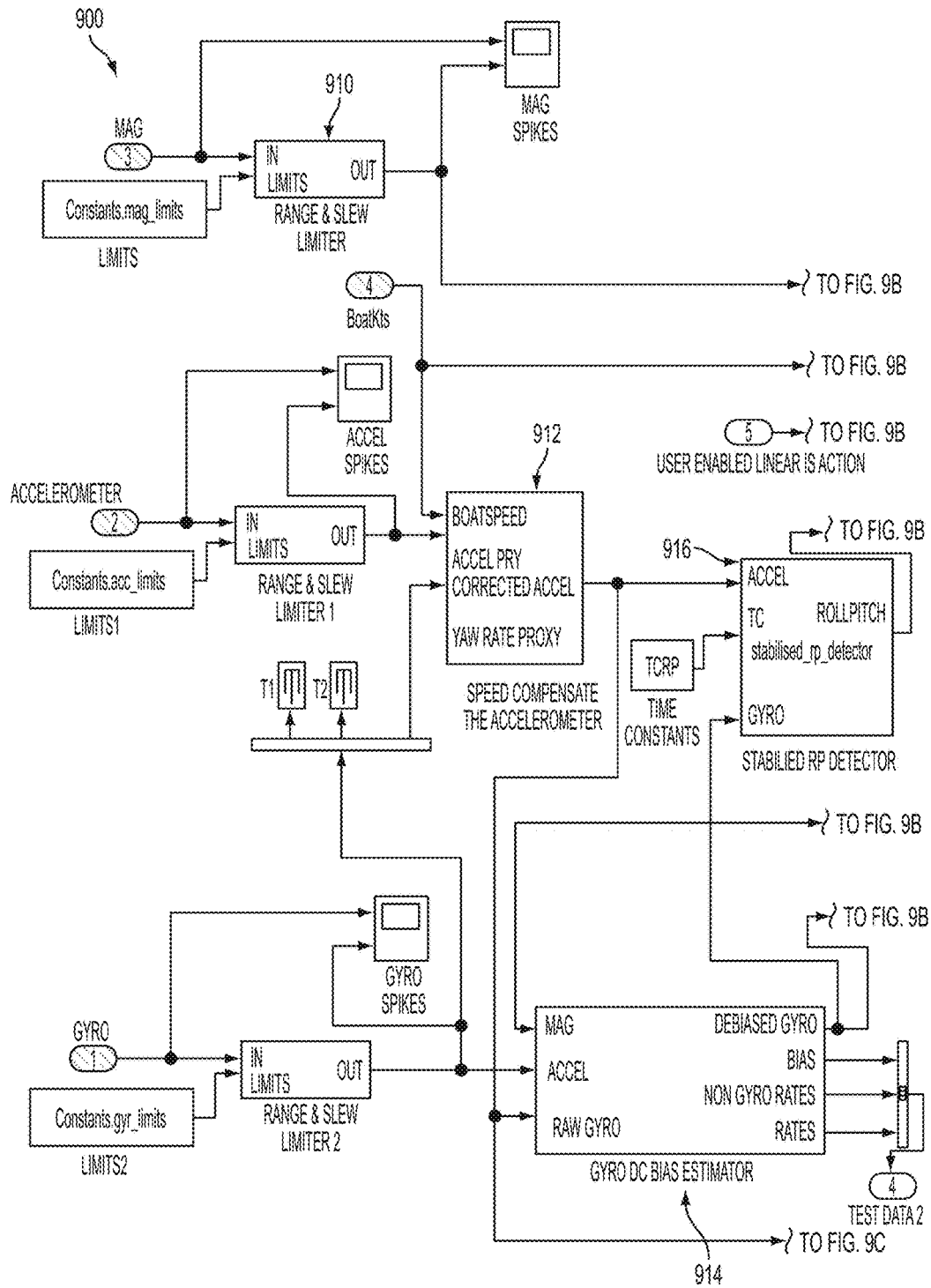
Figure 9B:
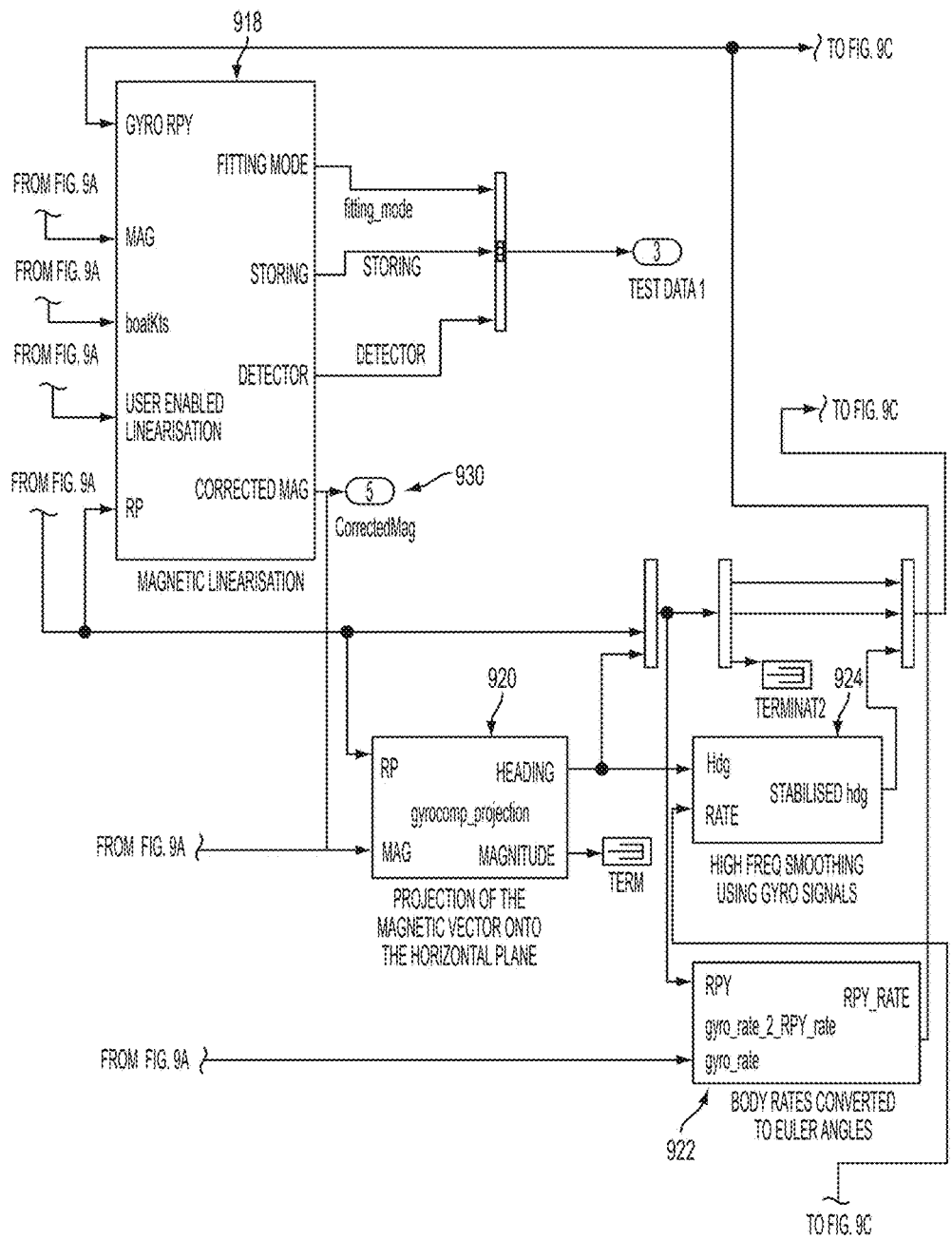
Figure 9C:
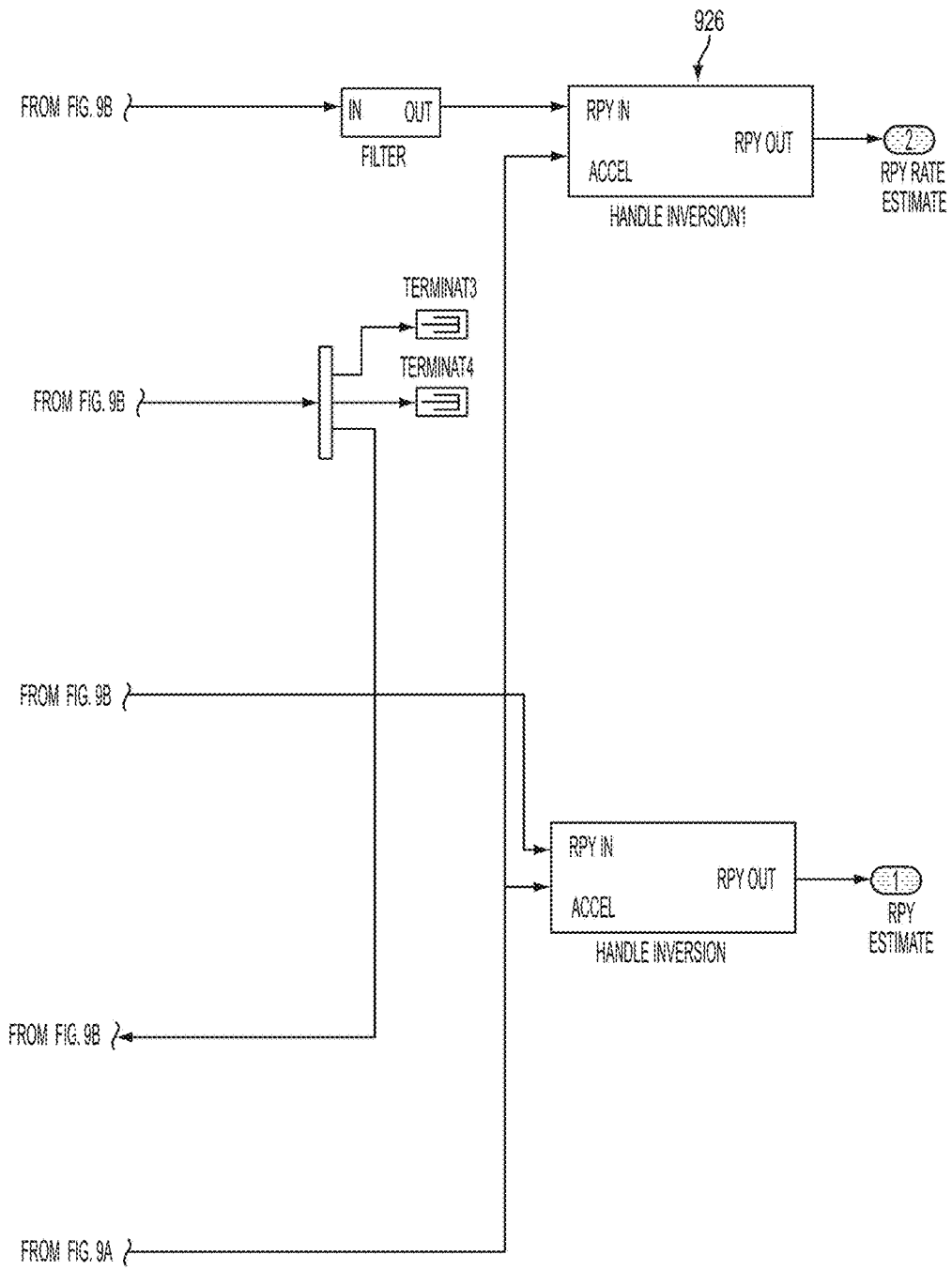

Process 900 of FIG. 9 illustrates an intermediate level view of a compass calibration process. In some embodiments, process 900 may correspond to logic block 820 in FIG. 8 and may include range and slew limiters 910 (e.g., applicable to the various sensor inputs), logic block 912 to provide motion compensated accelerations, logic block 914 to provide debiased angular velocities, logic block 916 to provide stabilized roll and pitch components of an orientation of compass 210 and/or mobile structure 101, logic block 918 to provide corrected magnetic fields 930, logic block 920 to provide headings of mobile structure 101 (e.g., using projections of corrected magnetic fields 930 onto stabilized horizontal planes), logic block 922 to determine corrected angular velocities of compass 210 and/or mobile structure 101, logic block 924 to provide stabilized headings, and/or selective inverters 926 to compensate for positive or negative vertical accelerations.

Figure 10:
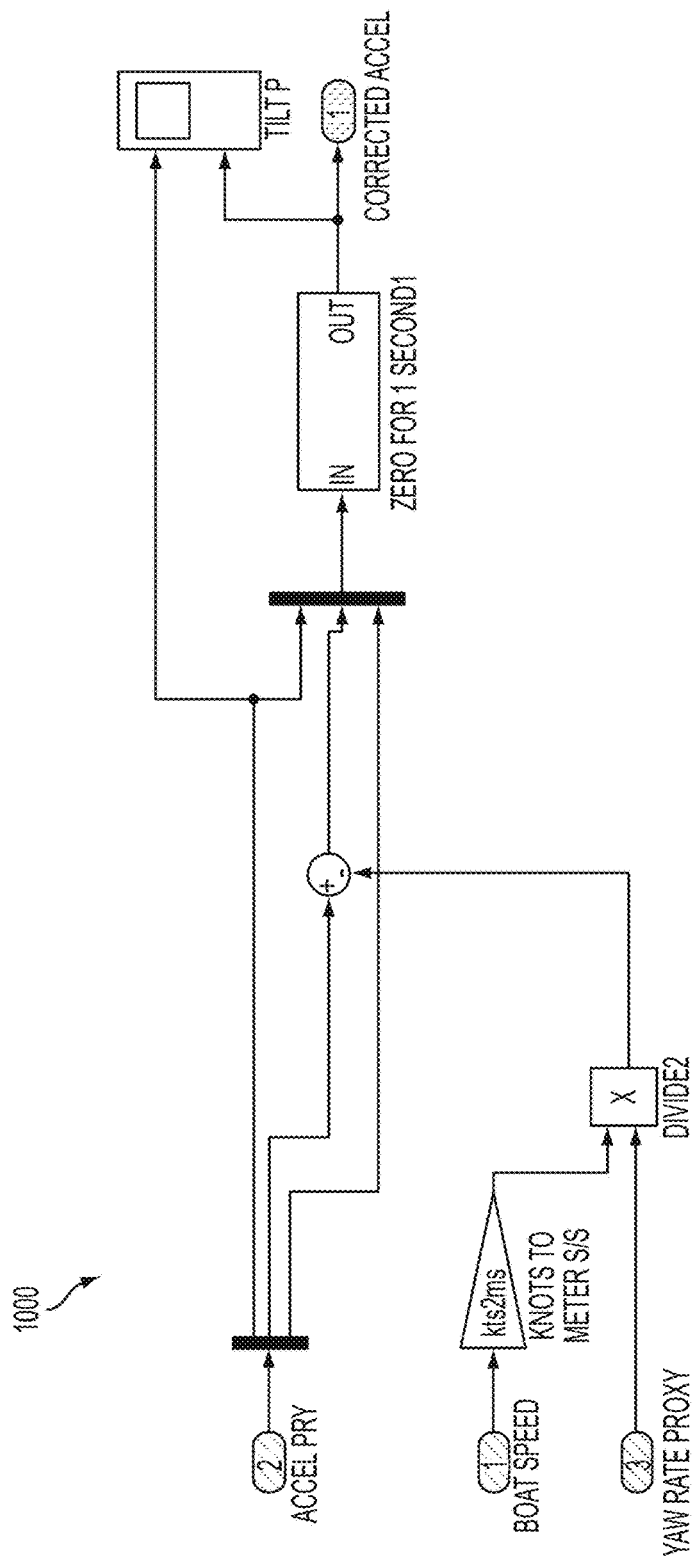

Process 1000 of FIG. 10 illustrates an intermediate level view of a compass calibration process. In some embodiments, process 1000 may correspond to logic block 912 in FIG. 9. In the embodiment shown, process 1000 provides motion compensation for accelerations due to roll experienced by compass 210 and/or mobile structure 101. In further embodiments, process 1000 may be adapted to include similar processes to compensate for motion corresponding to pitch experienced by compass 210 and/or mobile structure 101.

Figure 11:
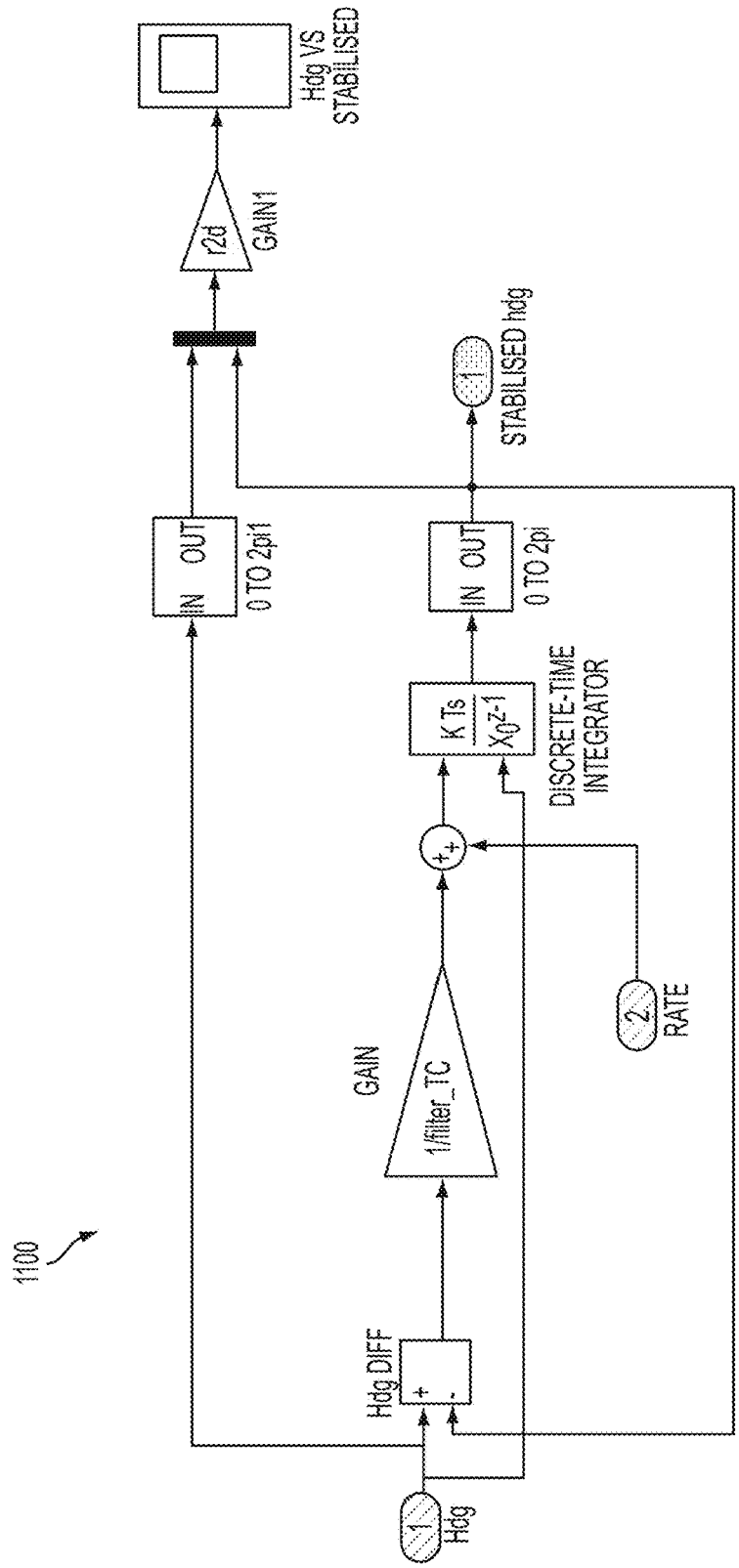

Process 1100 of FIG. 11 illustrates an intermediate level view of a compass calibration process. In some embodiments, process 1100 may correspond to logic block 924 in FIG. 9. In the embodiment shown, process 1100 provides stabilized headings from raw headings and corrected angular velocities.

Figure 12:
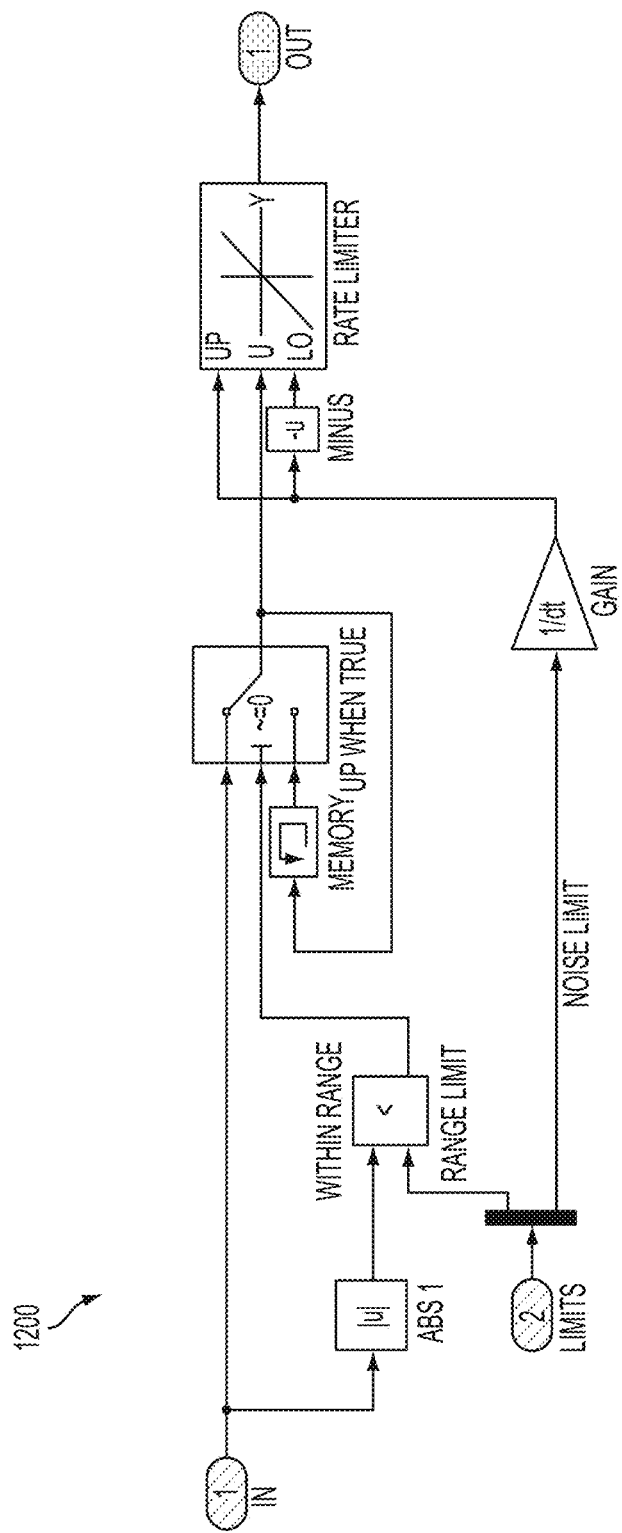

Process 1200 of FIG. 12 illustrates an intermediate level view of a compass calibration process. In some embodiments, process 1200 may correspond to logic blocks 910 in FIG. 9. In the embodiment shown, process 1100 provides range and rate limiting of an input sensor signal.

Figure 13:
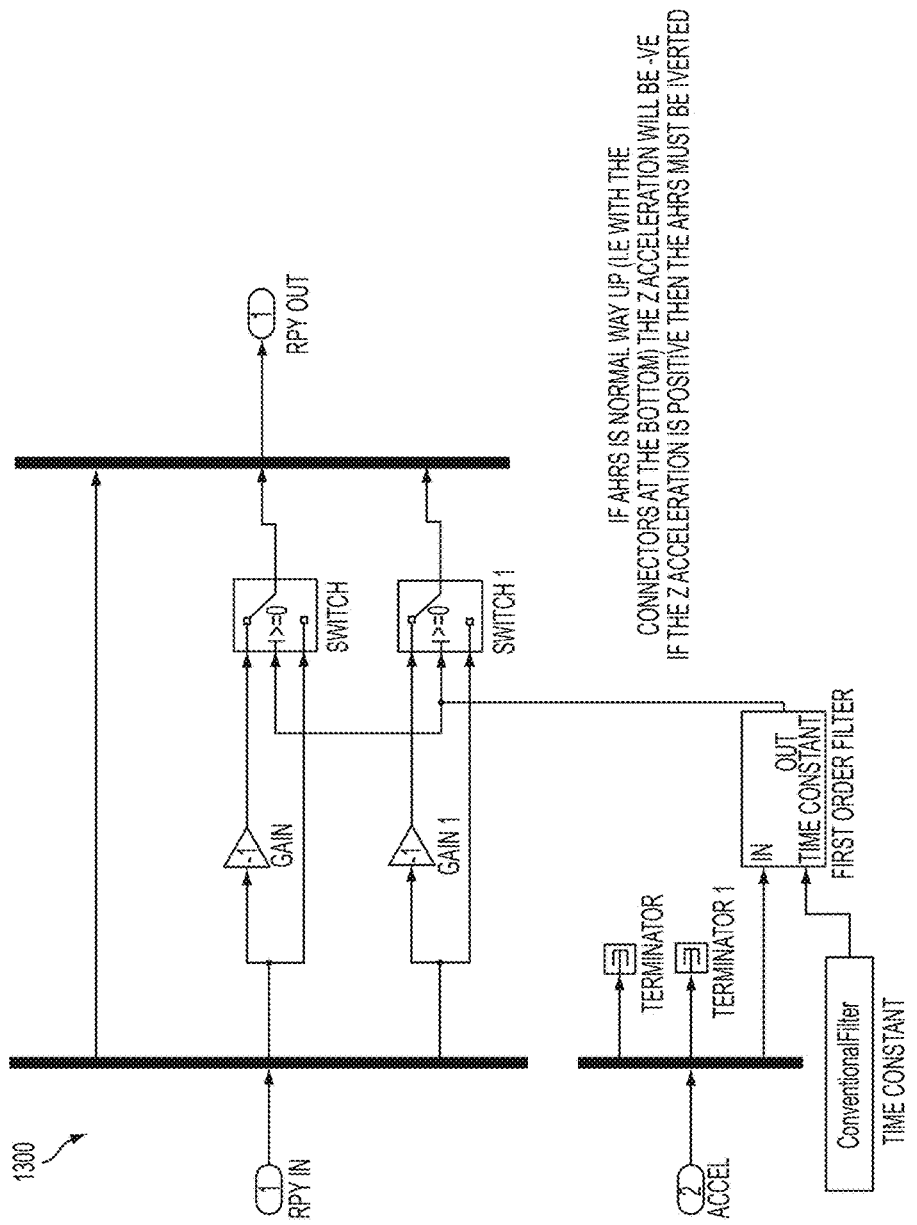

Process 1300 of FIG. 13 illustrates an intermediate level view of a compass calibration process. In some embodiments, process 1300 may correspond to logic block 926 in FIG. 9. In the embodiment shown, process 1300 inverts pitch and yaw components depending on a sign of a vertical acceleration.

Figure 14:
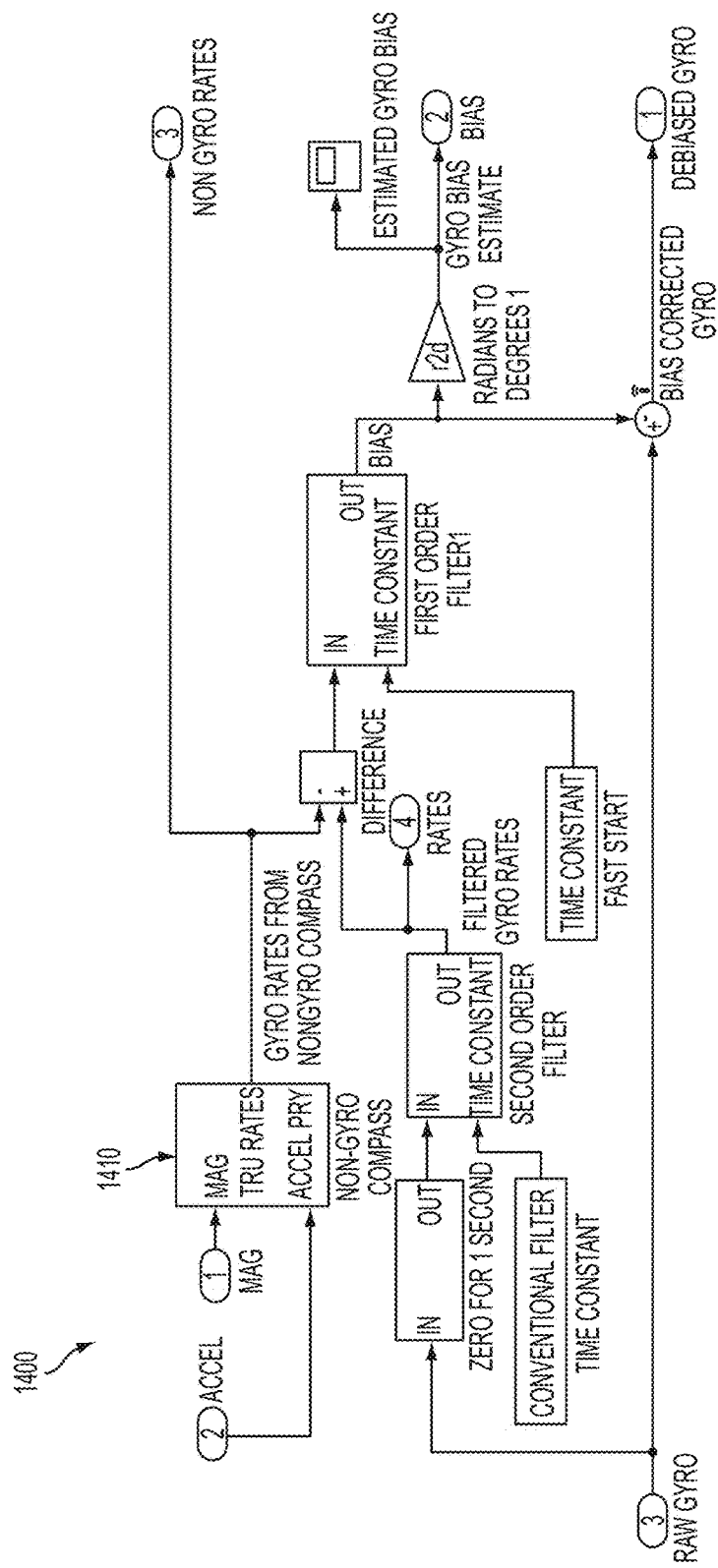

Process 1400 of FIG. 14 illustrates an intermediate level view of a compass calibration process. In some embodiments, process 1400 may correspond to logic block 914 in FIG. 9. In the embodiment shown, process 1400 provides debiased angular velocities by correcting raw angular velocities from gyroscope 240 using calculated angular velocities derived from accelerations from accelerometer 242 and magnetic fields (e.g., local magnetic fields and/or corrected magnetic fields) in logic block 1410.

Figure 15:
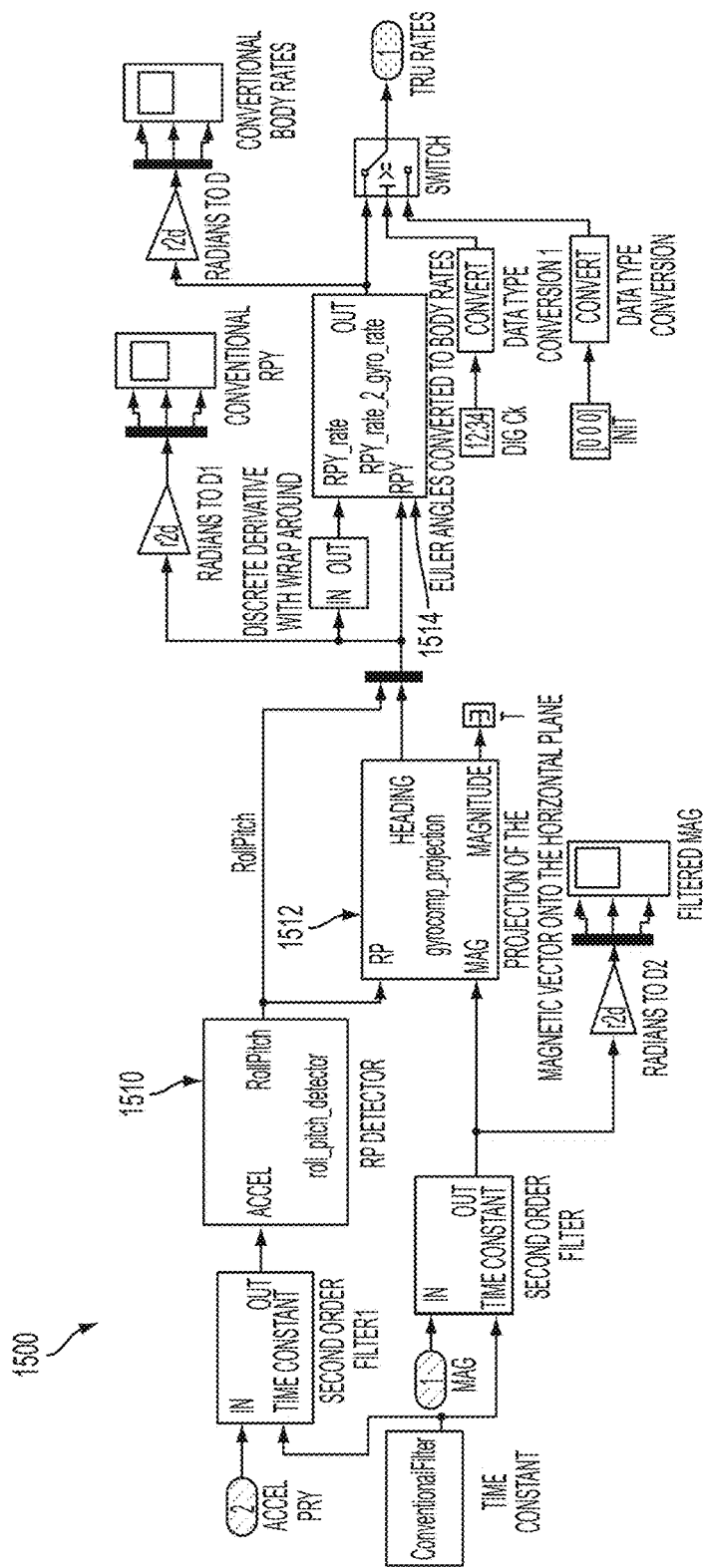

Process 1500 of FIG. 15 illustrates an intermediate level view of a compass calibration process. In some embodiments, process 1500 may correspond to logic block 1410 in FIG. 14. In the embodiment shown, process 1500 provides stabilized headings from raw headings and corrected angular velocities. In some embodiments, process 1500 may include logic block 1510 to determine intermediate roll and pitch components from accelerations, logic block 1512 to determine an intermediate heading of compass 210 and/or mobile structure 101 by projecting magnetic fields on a horizontal plane defined by the intermediate roll and pitch components, and/or block 1514 to determine an intermediate angular velocity from the intermediate roll and pitch components and the intermediate heading.

Figure 16:
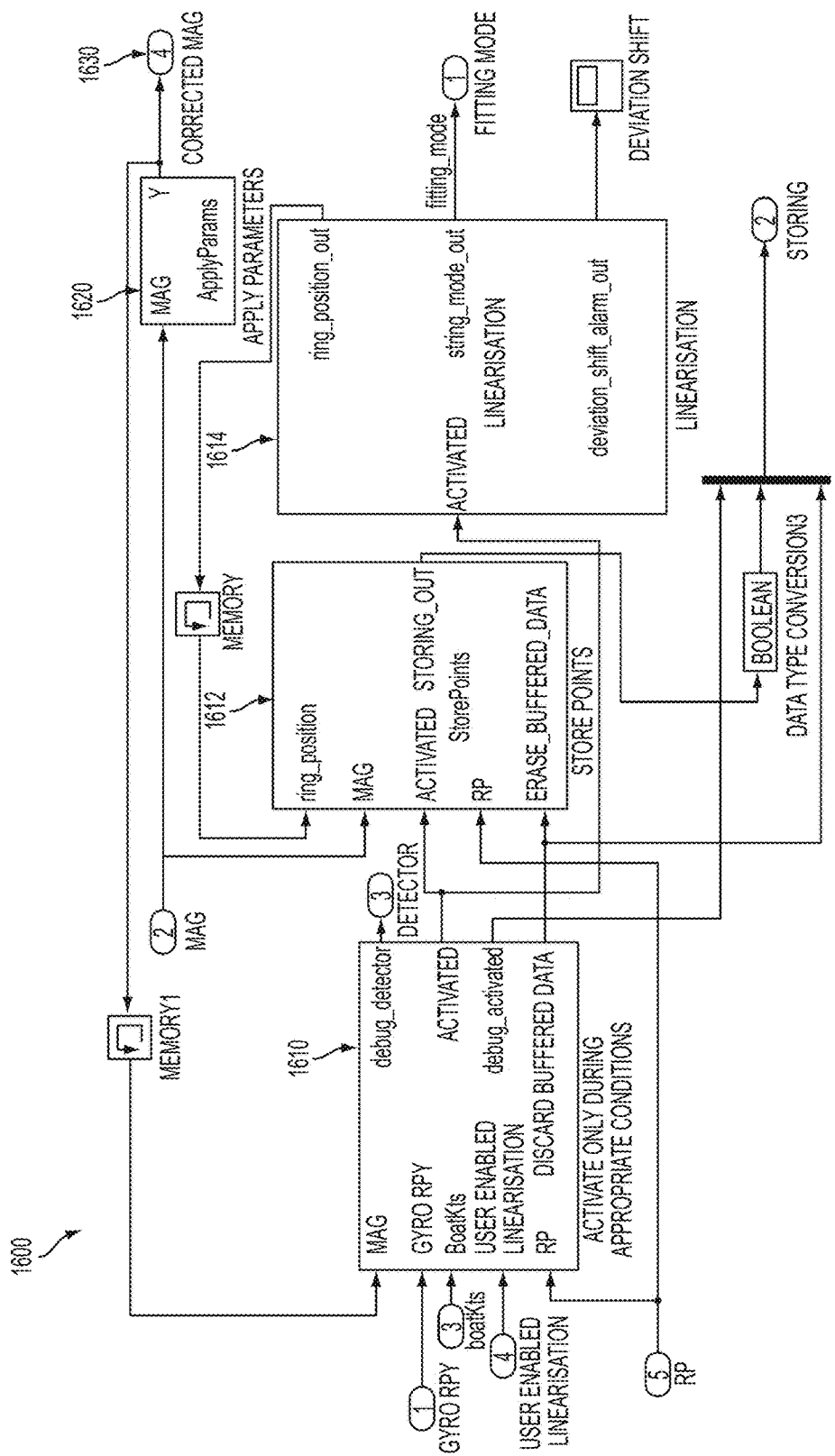

Process 1600 of FIG. 16 illustrates an intermediate level view of a compass calibration process. In some embodiments, process 1600 may correspond to logic block 918 in FIG. 9. In various embodiments, process 1600 may include logic block 1610 to determine if external conditions are appropriate to perform a calibration process, logic block 1612 to determine if internal conditions are appropriate to store a new calibration point, and/or logic block 1620 to apply calibration parameters to local magnetic fields to generate corrected magnetic fields 1630.

Figure 17A:
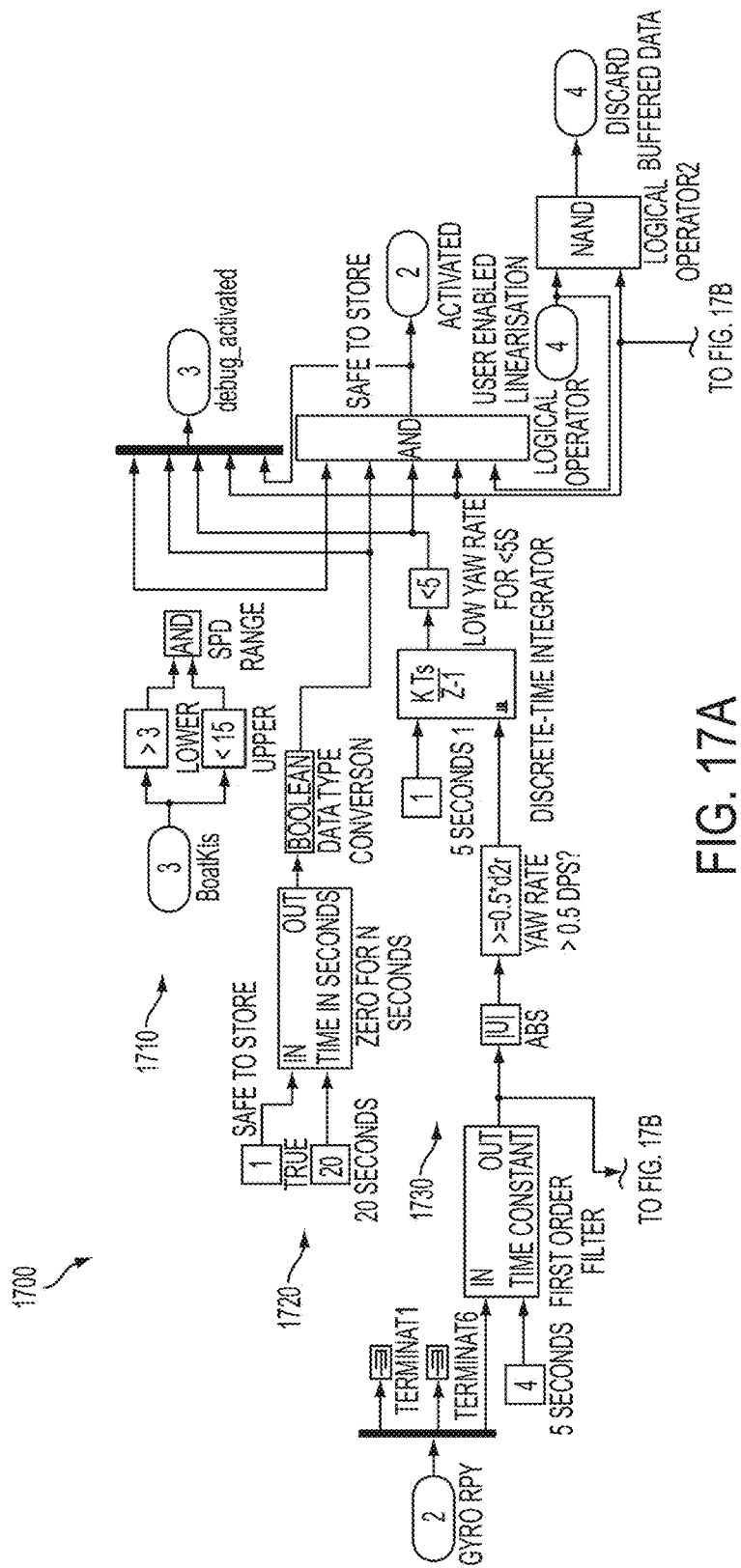
Figure 17B:
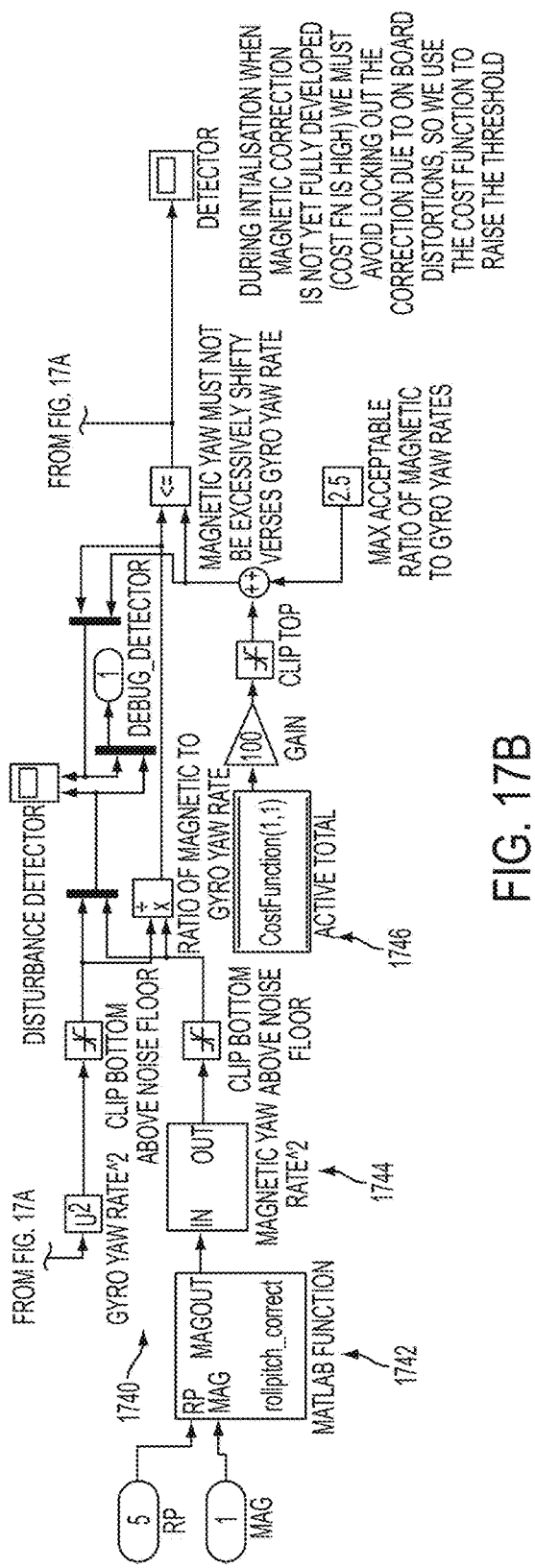

Process 1700 of FIG. 17 illustrates an intermediate level view of a compass calibration process. In some embodiments, process 1700 may correspond to logic block 1610 in FIG. 16. In various embodiments, process 1700 may include flow 1710 to determine if a speed is in an appropriate range, flow 1720 to determine if the conditions are satisfactory for a period of time, flow 1730 to determine if a gyroscope-derived yaw rate is within a particular range, and/or flow 1740 to determine if a ratio of a magnetic field-derived yaw rate (squared) to the gyroscope-derived yaw rate (squared) is in a particular range. Process 1700 may include logic block 1710 to provide a roll and pitch corrected magnetic field, logic block 1744 to determine a square of the magnetic field-derived yaw rate, and/or block 1746 to adjust the ratio limit based on the status of a corresponding cost function.

Figure 18:
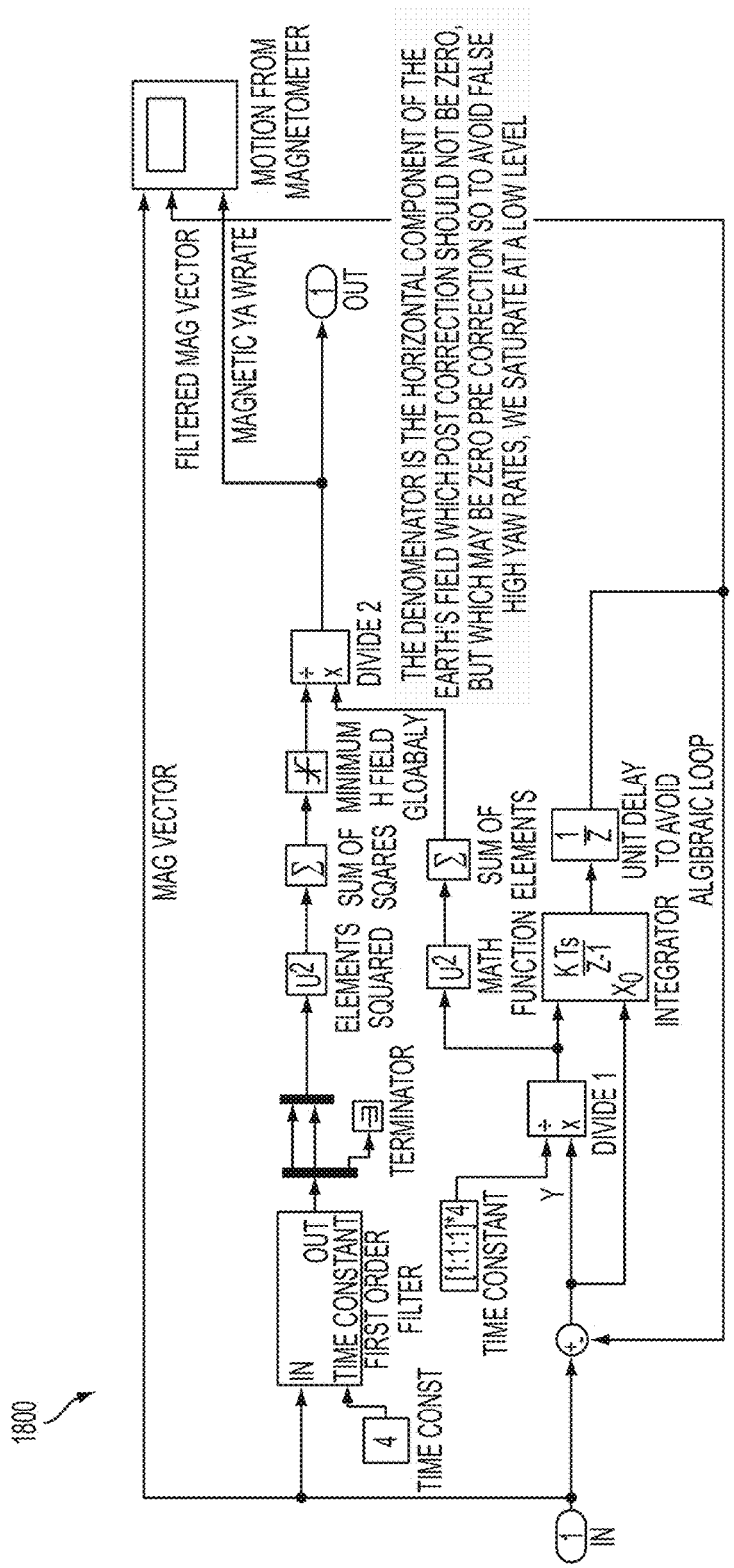

Process 1800 of FIG. 18 illustrates an intermediate level view of a compass calibration process. In some embodiments, process 1800 may correspond to logic block 1744 in FIG. 17. In various embodiments, process 1600 may determine a square of a magnetic field-derived yaw rate.

In some embodiments, gyroscope-derived angular velocities can be compared to magnetic field-derived angular velocities to detect magnetic disturbances. Once detected, calibration point storage can be locked out. In various embodiments, achieving a coherent, well distributed, memory efficient "mag/roll/pitch/age" data set may be accomplished by: ageing over 60 minutes to allow self-consistency during world-wide navigation, adding a new point only when it is far enough (in a 5d sense) from the prior point, and/or overwriting the least useful point once memory is full. In other embodiments, maintaining stability of the vertical correction may be accomplished by locking out adjustments to the H3 and S33 terms when vertical variance in the database of points is low. In some embodiments, the system may be configured to achieve a compromise between robustness to temporary disturbance to the ship's magnetic field and rapid adaptation to a permanent disturbance (e.g. a fire extinguisher or other metal object in the vicinity of the compass is repositioned) through the use of Active and Candidate parameters. Further details of example implementations according to one or more embodiments may be found in the attached diagrams and software implementations.

Figure 22A:

For example, FIGS. 19A-C illustrate embodiments of software code portions 1916, 1920, and 1922 implementing respective operations 916, 920, and 922 of FIG. 9, and FIGS. 20A-C illustrate embodiments of software code portions 2010, 2012, and 2014 implementing respective operations 1510, 1512, and 1514 of FIG. 15. FIGS. 21A-B illustrate an embodiment of a software code portion (split into portions 2112A and 2112B in FIGS. 21A and 21B) implementing operation 1612 of FIG. 16, and FIGS. 21A-C illustrate an embodiment of a software code portion (split into portions 2214A, 2214B, and 2214C in FIGS. 22A, 22B, and 22C) implementing operation 1614 of FIG. 16. Additionally, FIG. 22B includes function call 2280 configured to execute a subroutine illustrated in FIGS. 23A-B.

Figure 24:
FIGS. 24-25 illustrate software code of various operations to provide compass calibration in accordance with embodiments of the disclosure.
Figure 25:

FIGS. 23A-B illustrate an embodiment of a software code portion (split into portions 2314A and 2314B in FIGS. 23A and 23B) implementing a ring fitting routine. As noted herein, in some embodiments, software code portion 2314A-B may be executed as a subroutine to software code portion 2214A-C. FIG. 24 illustrates an embodiment of a software code portion 2420 implementing operation 1620 of FIG. 16, and FIG. 25 illustrates an embodiment of a software code portion 2542 implementing operation 1742 of FIG. 17.

Because the various processes described herein provide and/or utilize a highly accurate automatic compass calibration system, embodiments may be implemented to provide stabilized headings reliable enough to form the basis for a safe and accurate piloting control system, as described herein. Furthermore, where physical access to at least a portion of the automatic compass calibration system is restricted and/or limited, due to positioning of a compass relative to a mobile structure and/or the remoteness of a robot or drone to manual intervention, for example, the reduced operational power usage evidenced in embodiments of the present disclosure substantially increases the long-term utility and overall convenience of the system.

As described herein, automatic compass calibration techniques work by recording magnetic data as a vessel manoeuvers, and an ideal data set may be characterized as a ring of calibration points recorded as the vessel makes a complete circle. In general, as described herein, the ring of calibration points is non circular due to soft iron disturbances and offset due to hard iron disturbances that are close enough to be measured by the magnetic sensor (e.g., a magnetometer). For vessels experiencing heel and pitch (e.g., sailing boats, or sailing or power boats in rough weather), the ring of calibration points also contains information about the vertical hard and soft iron distribution around the sensor.

A typical set of calibration points may include fresh data from the most recently gathered magnetic readings and older data from previously recorded calibration points. Because of the dynamic nature of the earth's magnetic field globally, stored calibration points from a long time in the past may be associated with a part of the globe where the earth's magnetic field has a different strength or inclination, and so older calibration points may not be directly comparable (e.g., with respect to environmental conditions) to more current calibration points. For this reason, as well as to limit use of embedded processor memory, it can be important to age out older calibration points by removing them from the current set of calibration points used to set the current calibration parameters (e.g., which may be used to determine the corrected magnetic field experienced by the vessel or a portion of the vessel). For example, a ship travelling at 50 knots covers 50 nautical miles in an hour, and the earth's magnetic field can change significantly (e.g., relative to a correction used to provide a corrected magnetic field experienced by a vessel) over 100 nautical miles. As a result, to ensure a reliable compass calibration, stored measurements should be removed from the stored set of calibration points after a preset time period, such as approximately an hour. Such preset calibration point lifetime may be adjusted upwards or downwards based on measurements of the vessel's speed, position, local magnetic field, and/or other environmental conditions associated with the vessel that indicate a likely change in the magnetic environment. However, removing older measurements can lead to an ill conditioned set of calibration points and, ultimately, to an improperly characterized magnetic environment. For example, FIGS. 26 through 30 illustrate the result of progressive removal of older magnetic measurements from a set of calibration points, over time, as a mobile structure travels along a substantially unchanging heading.

Figure 26:
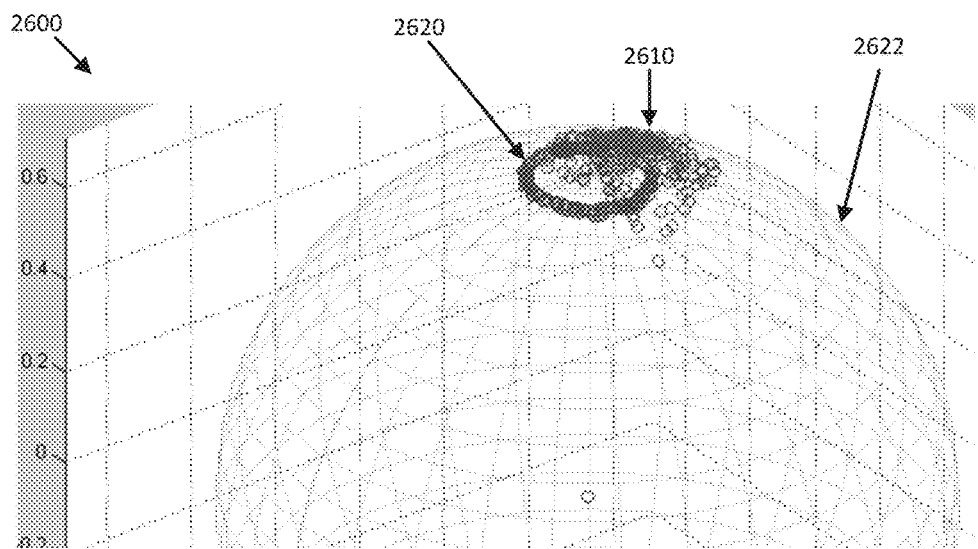
FIGS. 26-31 illustrate graphs of magnetic fields in accordance with an embodiment of the disclosure.
Figure 27:
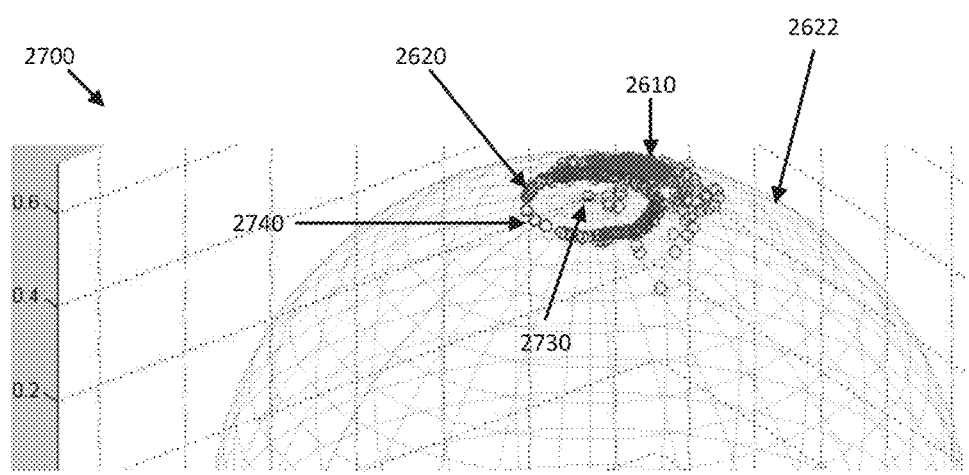

FIG. 26 illustrates a graph 2600 of magnetic fields in accordance with an embodiment of the disclosure. Graph 2600 shows plot 2610 including a number of measurements of a local magnetic field (e.g., calibration points) influenced by hard and soft disturbances (e.g., raw readings from a three dimensional magnetometer), and plot 2620 includes those same measurements after having been corrected (e.g., using a good calibration derived from the measurements in plot 2610) for roll and pitch and/or hard and/or soft magnetic disturbances, as illustrated by centered sphere 2622, and as described herein. In various embodiments, plot 2620 may represent a toroidal shape (and, in particular as shown in at least FIGS. 26-28, a valid portion of a toroidal shape), as described herein. While a vessel is on a steady heading, new calibration points are added with respect to a single general travel direction, and the distribution of calibration points starts to age out around the other directions. For example, FIG. 27 illustrates a graph 2700 of magnetic fields in accordance with an embodiment of the disclosure, where portions of the set of calibration points corresponding to plots 2610 and 2620 have been removed and replaced with new calibration points biased towards the steady heading of the mobile structure. As shown in FIG. 27, plots 2610 and 2620 include respective relatively sparse portions 2730 and 2740 corresponding to headings different from the steady heading and furthest in time from the start of the steady heading.

Figures 28, 29:
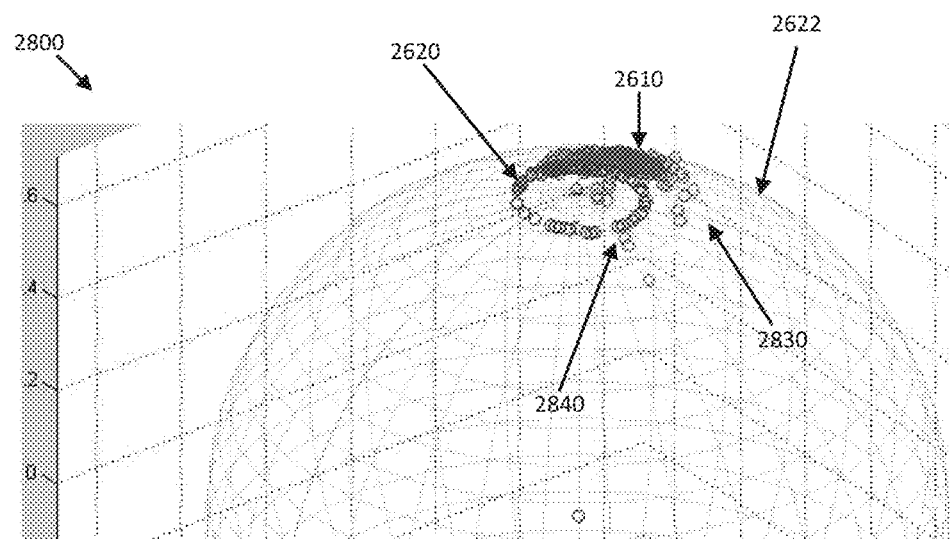
Figure 30:
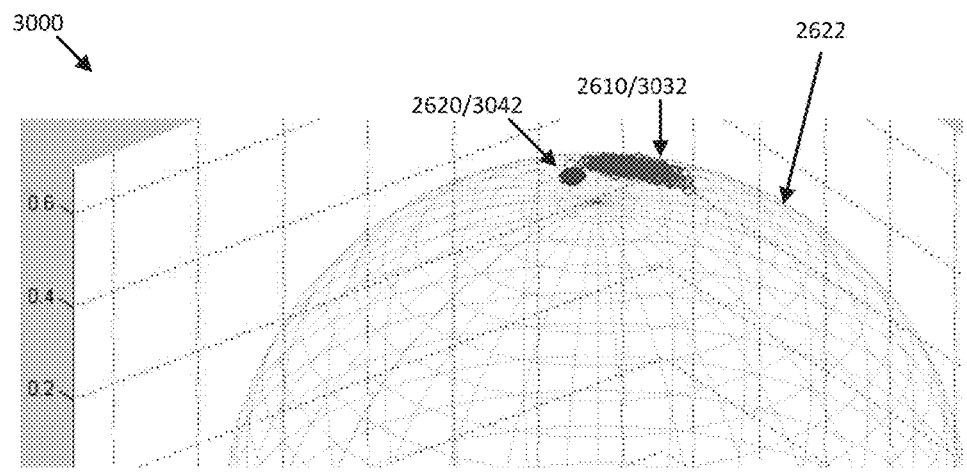

As time passes, the distributions of the sets of calibration points become increasingly narrow. FIG. 28 illustrates graph 2800 where plots 2610 and 2620 have been updated to include respective relatively sparse portions 2830 and 2840 caused by additional time traveled along the steady heading, and FIG. 29 illustrates a graph 2900 where plots 2610 and 2620 have been updated to show area 2940 where the ring of calibration points of plot 2620 has become incomplete. Also shown is the beginning of a cluster 2942 of calibration points corresponding to the steady heading of the mobile structure. FIG. 30 illustrates graph 3000 where plots 2610 and 2620 form respective clusters 3032 and 3042 corresponding to the steady heading/direction of travel of the mobile structure (e.g., over a time period greater than at least one preset calibration point lifetime).

Thus, as shown in the progression illustrated by FIGS. 26-30, a mobile structure, even one with an initially well calibrated compass, that proceeds on a lengthy passage at a substantially constant heading will at some point in time be presented with a cluster or partial cluster of calibration points roughly corresponding to the direction of travel. This cluster or partial cluster of calibration points may eventually fill all memory locations allocated for the set of calibration points used to determine the current calibration parameters, and an automatic compass calibration process attempting to recalibrate using the cluster or partial cluster of measurements would typically produce a false or invalid calibration.

Figure 31:
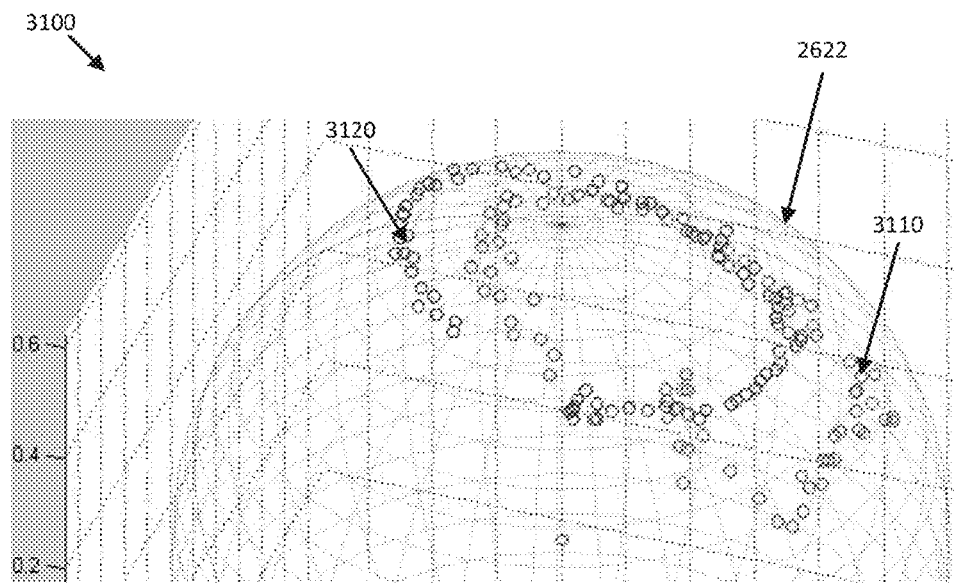

Embodiments of the present disclosure determine whether a set of magnetic data points (e.g., calibration points) are sufficiently dispersed to produce a valid compass calibration. Once corrected for roll and pitch, magnetic measurements from a circling vessel tend to form a data set that is roughly toroidal in form, and the toroidal shape may be characterized as resembling a ring with a thickness. The thickness of the ring can vary depending on the quality of the calibration and the degree of any disturbing fields local to the vessel, for example. A good calibration results in a near perfect ring (as shown by plot 2620 in FIG. 26), but a poor calibration results in a distorted ring caused by uncorrected magnetic distortions. For example, FIG. 31 illustrates a graph 3100 of magnetic fields in accordance with an embodiment of the disclosure. Graph 3100 shows plot 3110 including a number of measurements (e.g., raw readings from a three dimensional magnetometer) of a local magnetic field that have been influenced by hard and/or soft disturbances, and plot 3120 includes those same measurements after having been processed using a poor calibration.

Though distorted, the magnetic measurements in plot 3110 can be processed to obtain a set of calibration parameters, as explained herein. While magnetic measurements from a vessel heading in substantially a single direction will not have a fully toroidal form (e.g., as shown most obviously in FIGS. 29 and 31), system 100 may be configured to detect a partial toroid or ring (e.g., in 3d space) in the measurement data and selectively perform the calibration process using at least the magnetic measurement data corresponding to the detected partial toroid, depending on the amount of the partial toroid available for the calibration process. FIG. 32 illustrates one process to detect an amount of measurement data available for a calibration process by determining how much of a toroidal shape (e.g., formed from the measurement data) is available for further calibration processing, such as calibration processing including determining calibration parameters, determining hard and/or soft iron disturbance corrections, and/or determining overall compass calibration, as described herein.

More generally, FIG. 32 illustrates software code portion 3200 implementing various operations to provide compass calibration in accordance with an embodiment of the disclosure. In the embodiment shown in FIG. 32, software code portion 3200 may be implemented as a function call accepting various inputs and providing a value (e.g., a percentage) representing the portion of a toroid or toroidal shape of magnetic measurement data that is available for further calibration processing. As shown in FIG. 32, the various inputs for code portion 3200 may include "ring", "ring_centre", and/or "usable", where "ring" may be implemented as an array of roll/pitch corrected three dimensional (e.g., x, y, z) calibration points (e.g., the blue points in FIGS. 26-31, corresponding to three dimensional magnetic measurement data that has been corrected for roll and/or pitch of the coupled mobile structure), "ring_centre" may be implemented as the two dimensional (e.g., x, y) geometric center of the "ring" (e.g., ring_centre may be approximately [(max(ring(x))−min(ring(x)))/2, (max((ring(y))−min((ring(y)))/2], and "usable" may be implemented as the usable points (e.g., data takes time to gather, and can be aged out) out of the total included in "ring". In some embodiments, the total number of calibration points in "ring" may be limited to approximately 200, 300, 400, and/or other preset limits based on environmental conditions (e.g., indicating a difficulty of determining a calibration) and/or system memory limits, for example. In various embodiments, "ring_centre" may be calculated within embodiments of code portion 3200.

In general, software code portion 3200 may be configured to analyze each measurement point (e.g., in "ring") to determine the total portion of a toroidal or ring shape of the measurement data that is available for calibration processing. If the total portion of the toroidal shape is sufficiently complete (e.g., above a preset threshold), then further calibration processing, such as determining calibration parameters to determine a corrected magnetic field as described herein, may be performed. In some embodiments, all available magnetic measurement data (e.g., currently stored, newly acquired, within "ring", and/or designated "usable") may be used for the calibration process, regardless of whether it falls within the detected total available portion of the toroidal or ring shape of the measurement data.

For example, in one embodiment, software code portion 3200 may be configured to arrange magnetic measurement data (e.g., in "ring") about a centroid (e.g., "ring_centre") of the measurement data to facilitate detection of a toroidal shape of the measurement data. In such embodiments, the arranged measurement data may be sorted by its position relative to the centroid and/or segregated into different portions or spokes of the toroidal shape of the measurement data. For example, in some embodiments, each spoke of the toroidal shape may be characterized by a solid angle range about the centroid (e.g., the 36 solid angles, each 10 degrees in width, in the x-y plane) of the measurement data. In one embodiment, code portion 3200 may be configured to detect the spokes of the toroidal shape containing measurement data, for example, and to determine the total portion of the toroidal shape of the measurement data as the spokes containing measurement data. In some embodiments, spokes containing measurement data may be designated as valid spokes, and/or spokes lacking measurement data may be designated as invalid spokes.

In another embodiment, code portion 3200 may be configured to characterize the quality of measurement data before determining the total portion of a toroid or ring shape of the measurement data that is available for calibration processing. For example, in some embodiments, code portion 3200 may be configured to determine a variance between measurement point radiuses (e.g., distances from a measurement to the center of the ring) from one point to the next. If the point to point variance is large (e.g., relative to a preset threshold), then that portion of the toroidal shape may be determined relatively thick, of relatively low quality, and unavailable for further calibration processing. In some embodiments, the assessment of relative thickness may be performed according to different spokes of the toroidal shape. For example, for each spoke, the relative thickness may be determined as the largest point-to-point separation in the spoke divided (e.g., normalized) by the smallest point radius in the spoke. In such embodiments, for each spoke, the relative thickness may be compared against a threshold to determine whether the measurement data within the spoke is of sufficient quality to be used for further processing (e.g., the spoke is relatively thin, and therefore valid) or is not of sufficient quality to indicate the spoke is valid (e.g., the spoke is relatively thick, and therefore invalid, thereby indicating the data is potentially unsuitable for further calibration processing). In similar embodiments, code portion 3200 may be configured to determine a minimum radius for each spoke (e.g., a minimum distance between a measurement and the centroid, for all measurements within a spoke, indicating the possible presence or absence of a toroidal shape of the magnetic measurement data) and invalidate spokes with minimum radiuses less than a preset threshold minimum radius.

In various embodiments, the total portion (e.g., in percent) of the toroidal shape of the measurement data that is available for calibration processing may be represented by the number of valid spokes divided by the total number of spokes, and this value may be provided as the output of software code portion 3200. In the embodiment shown in FIG. 32, lines 3210 may be configured to arrange magnetic measurement data (e.g., in "ring") about a centroid (e.g., "ring_centre") of the measurement data to facilitate detection of a toroidal shape of the measurement data, lines 3220 may be configured to determine a relative thickness for a spoke, a minimum radius for a spoke, and/or a presence of measurement data within a spoke, lines 3230 may be configured to generate validity statistics for each spoke, and lines 3240 may be configured to determine and provide the total portion (e.g., in percent) of the toroidal shape of the measurement data that is valid and/or available for further calibration processing. In some embodiments, lines 3240 may be configured to provide such total portion relative to a fraction or percentage of a full 360 degrees that is user selected or preselected as necessary to produce a reliable calibration.

In some embodiments, system 100 may be configured to receive the total available portion of the toroidal shape of the measurement data and to proceed with determining calibration parameters from the measurement data if the total available portion of the toroidal shape is above a preset threshold (e.g., 50, 60, 70, 75, or 80%, for example). In some embodiments, the calibration parameters may be derived from magnetic measurements within the determined total available portion of the toroidal shape of the measurement data. In other embodiments, the calibration parameters may be derived from all available magnetic measurements (e.g., those within and outside the determined total available portion of the toroidal shape of the measurement data). If the total available portion of the toroidal shape is below a present threshold, system 100 may be configured to continue to use already established calibration parameters, for example, or to notify a user that the compass is not calibrated or is providing un-calibrated output.

Figure 33:
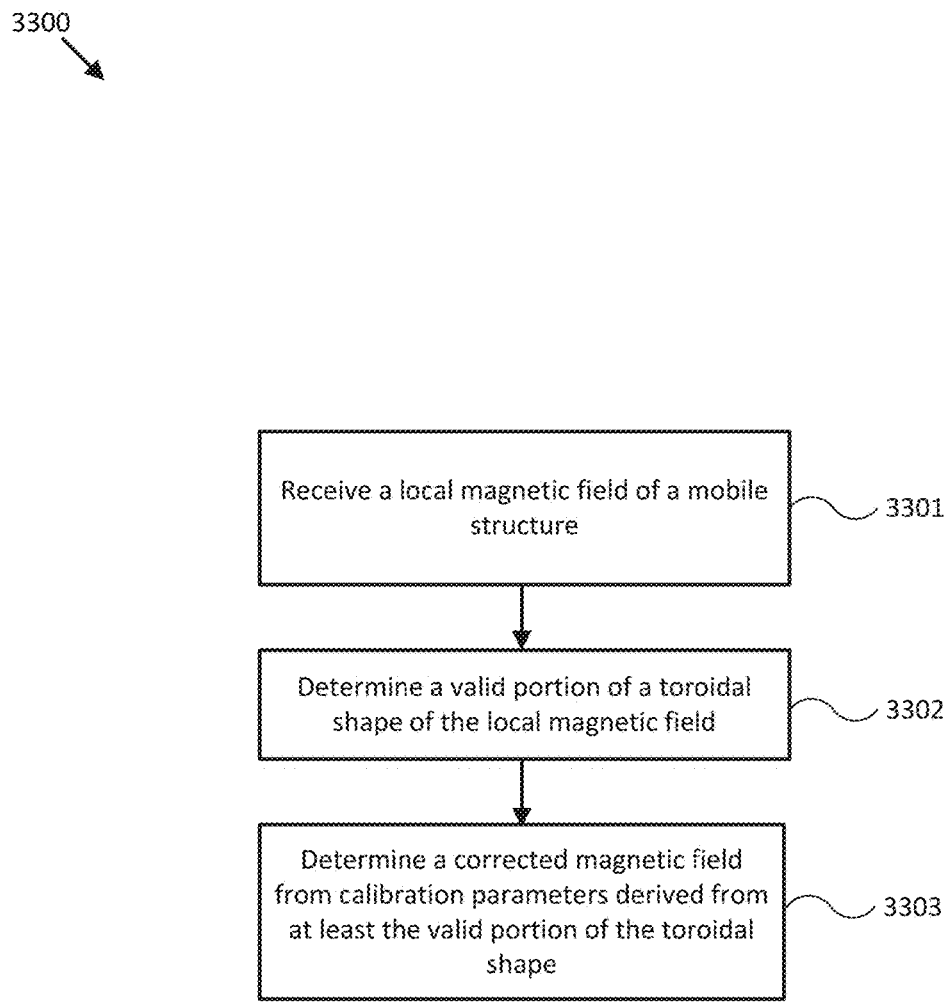
FIG. 33 illustrates a flow diagram of various operations to provide compass calibration in accordance with an embodiment of the disclosure.

FIG. 33 illustrates a flow diagram of processes 3300 to provide automatic compass calibration for compass 210 of mobile structure 101 in accordance with embodiments of the disclosure. In some embodiments, the operations of FIG. 33 may be implemented as software instructions executed by one or more logic devices associated with corresponding electronic devices and/or sensors of system 100 of FIG. 1 and/or system 200 of FIG. 2. More generally, the operations of FIG. 33 may be implemented with any combination of software instructions and/or electronic hardware (e.g., inductors, capacitors, amplifiers, or other analog and/or digital components).

It should be appreciated that any step, sub-step, sub-process, or block of process 3300 may be performed in an order or arrangement different from the embodiments illustrated by FIG. 33. For example, in other embodiments, one or more blocks may be omitted from the process, and blocks from one process may be included in another process. Furthermore, block inputs, block outputs, various sensor signals, sensor information, calibration parameters, and/or other operational parameters may be stored to one or more memories of systems 100 and/or 200 prior to moving to a following portion of a corresponding process. Although process 3300 is described with reference to systems 100 and 200, process 3300 may be performed by other systems different from systems 100 and 200 and including a different selection of electronic devices, sensors, mobile structures, and/or mobile structure attributes.

Process 3300 may represent a process for determining calibration parameters for compass 210, as described herein. In block 3301, controller 130 receives a local magnetic field of mobile structure 101. For example, controller 130 may be configured to receive a series of magnetic measurements from magnetometer 110 associated with mobile structure 101. Controller 130 may also be configured to receive measurements of various other environmental conditions and/or states of mobile structure 101, such as an angular velocity, an acceleration, and/or a speed of mobile structure 101. In some embodiments, controller 130 may be configured to correct the series of magnetic measurements for a roll and/or a pitch of mobile structure 101, for example, and/or for a prior detected hard or soft iron disturbance (e.g., by applying a previously established calibration) before proceeding to block 302.

In block 3302, controller 130 determines a valid portion of a toroidal shape of the local magnetic field received in block 3301. For example, controller 130 may be configured to determine a presence of magnetic measurements, a minimum radius, and/or a thickness corresponding to differentiated spokes of the toroidal shape. Controller 130 may be configured to designate a spoke as valid if a magnetic measurement is within the spoke, if the minimum radius is greater than or equal to a minimum threshold radius (or less than or equal to a maximum threshold radius), and/or if the thickness of the spoke is less than or equal to a maximum threshold thickness, for example. In some embodiments, controller 130 may be configured to determine the valid portion of the toroidal shape is greater than or equal to a preset validity threshold before proceeding to block 3303.

In block 3303, controller 130 determines a corrected magnetic field from calibration parameters derived from at least the valid portion of the toroidal shape determined in block 3302. For example, controller 130 may be configured to derive the calibration parameters from calibration points corresponding to magnetic measurements within the valid portion of the toroidal shape determined in block 3302. In other embodiments, controller 130 may be configured to derive the calibration parameters from calibration points corresponding to all available magnetic measurements, including those stored in memory, newly acquired magnetic measurements, and/or those within and outside the valid portion of the toroidal shape determined in block 3302. Controller 130 may be configured to apply the calibration parameters to the series of magnetic measurements to determine the corrected magnetic field, which can be used to indicate a calibrated and/or stabilized heading for mobile structure 101, as described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a logic device configured to receive one or more sensor signals and determine a corrected magnetic field based, at least in part, on a measured local magnetic field, wherein the logic device is configured to:
   receive the measured local magnetic field comprising a series of magnetic measurements associated with a mobile structure;
   determine a valid portion of a toroidal shape of the series of magnetic measurements that is available for further processing; and
   determine the corrected magnetic field based, at least in part, on calibration parameters derived from at least the valid portion of the toroidal shape.

2. The system of claim 1, wherein the logic device is configured to:
   correct the series of magnetic measurements for a roll and/or pitch of the mobile structure before determining the valid portion of the toroidal shape of the series of magnetic measurements.

3. The system of claim 1, wherein the determining the valid portion of the toroidal shape of the series of magnetic measurements comprises:
   designating a spoke of the toroidal shape as valid based, at least in part, on a presence of one or more magnetic measurements within the spoke.

4. The system of claim 1, wherein the determining the valid portion of the toroidal shape of the series of magnetic measurements comprises:
   determining a centroid of the series of magnetic measurements;
   determining a minimum radius, relative to the centroid, of one or more magnetic measurements within a spoke of the toroidal shape; and
   designating the spoke as valid based, at least in part, on the minimum radius.

5. The system of claim 1, wherein the determining the valid portion of the toroidal shape of the series of magnetic measurements comprises:
   determining a centroid of the series of magnetic measurements;
   determining a thickness of a spoke of the toroidal shape associated with two or more magnetic measurements within the spoke; and
   designating the spoke as valid based, at least in part, on the thickness of the spoke.

6. The system of claim 1, wherein the logic device is configured to:
   determine the valid portion of the toroidal shape is greater than or equal to a preset validity threshold before deriving the calibration parameters from at least the valid portion of the toroidal shape; and/or
   correct the series of magnetic measurements for soft iron and/or hard iron disturbances using prior calibration parameters before determining the valid portion of the toroidal shape of the series of magnetic measurements.

7. The system of claim 1, wherein the logic device is configured to:
   receive an angular velocity, an acceleration, and/or a speed of a mobile structure;
   generate stabilized roll and pitch components of an orientation of the mobile structure based, at least in part, on the acceleration and angular velocity; and
   correct the series of magnetic measurements for a roll and pitch of the mobile structure using the stabilized roll and pitch components before determining the valid portion of the toroidal shape of the series of magnetic measurements.

8. The system of claim 7, wherein the logic device is configured to:
   determine that external conditions corresponding to the angular velocity, the acceleration, the measured local magnetic field, and/or the speed of the mobile structure are appropriate for performing a calibration process;
   determine that internal conditions corresponding to a set of prior calibration points are appropriate to store a calibration point corresponding to the angular velocity, the acceleration, the measured local magnetic field, and/or the speed of the mobile structure;
   store the calibration point; and
   determine, from the set of prior calibration points and/or the calibration point, the calibration parameters, wherein the calibration point comprises at least one of the series of magnetic measurements within the valid portion of the toroidal shape.

9. The system of claim 7, wherein:
   the stabilized roll and pitch components define a stabilized horizontal plane;
   the logic device is configured to determine a heading of the mobile device based, at least in part, on a projection of the corrected magnetic field onto the stabilized horizontal plane; and
   the determined heading is relatively insensitive to signal artifacts in yaw-rate components of the received angular velocity.

10. The system of claim 1, wherein the logic device is configured to:
    generate a raw heading based, at least in part, on the stabilized roll and pitch and/or the corrected magnetic field;
    generate a corrected angular velocity of the mobile structure based, at least in part, on a debiased angular velocity of the mobile structure, the raw heading, and/or the stabilized roll and pitch;
    determine a stabilized heading based, at least in part, on the raw heading and the corrected angular velocity; and
    generate control signals for a steering actuator corresponding to a difference between a user-defined heading and the stabilized heading.

11. The system of claim 1, further comprising a user interface and a magnetometer configured to provide the series of magnetic measurements, wherein the logic device, the user input, and the magnetometer are implemented within a common housing, the mobile structure comprises a smart phone, a terrestrial robot, an aerial drone, a motorboat, a sailboat, an automobile, and/or an airplane, and the logic device is configured to:
receive user input from the user interface corresponding to a user-defined heading; and
display the user-defined heading and/or the corrected magnetic field using the user interface.

12. A method comprising:
receiving a measured local magnetic field comprising a series of magnetic measurements associated with a mobile structure;
determining a valid portion of a toroidal shape of the series of magnetic measurements that is available for further processing; and
determining a corrected magnetic field based, at least in part, on calibration parameters derived from at least the valid portion of the toroidal shape.

13. The method of claim 12, further comprising:
correcting the series of magnetic measurements for a roll and/or pitch of the mobile structure before determining the valid portion of the toroidal shape of the series of magnetic measurements.

14. The method of claim 12, wherein the determining the valid portion of the toroidal shape of the series of magnetic measurements comprises:
designating a spoke of the toroidal shape as valid based, at least in part, on a presence of one or more magnetic measurements within the spoke.

15. The method of claim 12, wherein the determining the valid portion of the toroidal shape of the series of magnetic measurements comprises:
determining a centroid of the series of magnetic measurements;
determining a minimum radius, relative to the centroid, of one or more magnetic measurements within a spoke of the toroidal shape; and
designating the spoke as valid based, at least in part, on the minimum radius.

16. The method of claim 12, wherein the determining the valid portion of the toroidal shape of the series of magnetic measurements comprises:
determining a centroid of the series of magnetic measurements;
determining a thickness of a spoke of the toroidal shape associated with two or more magnetic measurements within the spoke; and
designating the spoke as valid based, at least in part, on the thickness of the spoke.

17. The method of claim 12, further comprising:
determining the valid portion of the toroidal shape is greater than or equal to a preset validity threshold before deriving the calibration parameters from at least the valid portion of the toroidal shape.
correcting the series of magnetic measurements for soft iron and/or hard iron disturbances using prior calibration parameters before determining the valid portion of the toroidal shape of the series of magnetic measurements;
receiving an angular velocity, an acceleration, and/or a speed of a mobile structure;
generating stabilized roll and pitch components of an orientation of the mobile structure based, at least in part, on the acceleration and angular velocity; and
correcting the series of magnetic measurements for a roll and pitch of the mobile structure using the stabilized roll and pitch components before determining the valid portion of the toroidal shape of the series of magnetic measurements.

18. The method of claim 17, further comprising:
determining that external conditions corresponding to the angular velocity, the acceleration, the measured local magnetic field, and/or the speed of the mobile structure are appropriate for performing a calibration process;
determining that internal conditions corresponding to a set of prior calibration points are appropriate to store a calibration point corresponding to the angular velocity, the acceleration, the measured local magnetic field, and/or the speed of the mobile structure;
storing the calibration point; and
determining, from the set of prior calibration points and/or the calibration point, the calibration parameters, wherein the calibration point comprises at least one of the series of magnetic measurements within the valid portion of the toroidal shape.

19. The method of claim 17, wherein:
the stabilized roll and pitch components define a stabilized horizontal plane;
the method further comprises determining a heading of the mobile device based, at least in part, on a projection of the corrected magnetic field onto the stabilized horizontal plane; and
the determined heading is relatively insensitive to signal artifacts in yaw-rate components of the received angular velocity.

20. The method of claim 17, further comprising:
generating a raw heading based, at least in part, on the stabilized roll and pitch and/or the corrected magnetic field;
generating a corrected angular velocity of the mobile structure based, at least in part, on a debiased angular velocity of the mobile structure, the raw heading, and/or the stabilized roll and pitch;
determining a stabilized heading based, at least in part, on the raw heading and the corrected angular velocity;
generating control signals for a steering actuator corresponding to a difference between a user-defined heading and the stabilized heading; and
wherein the mobile structure comprises a smart phone, a terrestrial robot, an aerial drone, a motorboat, a sailboat, an automobile, and/or an airplane, the method further comprising:
receiving user input from a user interface corresponding to a user-defined heading; and
displaying the user-defined heading and/or the corrected magnetic field using the user interface.

* * * * *